United States Patent
Novascone et al.

(10) Patent No.: US 7,357,030 B2
(45) Date of Patent: Apr. 15, 2008

(54) APPARATUS AND METHODS FOR DETERMINING AT LEAST ONE CHARACTERISTIC OF A PROXIMATE ENVIRONMENT

(75) Inventors: Stephen R. Novascone, Idaho Falls, ID (US); Phillip B. West, Idaho Falls, ID (US); Michael J. Anderson, Troy, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 225 days.

(21) Appl. No.: 10/988,065

(22) Filed: Nov. 11, 2004

(65) Prior Publication Data

US 2006/0096380 A1 May 11, 2006

(51) Int. Cl.
*G01N 29/00* (2006.01)
*G01N 1/00* (2006.01)
*G01V 1/40* (2006.01)

(52) U.S. Cl. .................. 73/649; 73/152.04; 73/152.47; 181/102

(58) Field of Classification Search .................. 73/649, 73/152.04, 152.05, 152.06, 152.12, 152.01, 73/152.46, 152.47; 367/25; 181/102, 108
See application file for complete search history.

(56) References Cited

U.S. PATENT DOCUMENTS

| | | | |
|---|---|---|---|
| 2,244,484 A | | 6/1941 | Beers |
| 2,773,236 A | * | 12/1956 | Martin et al. ................ 324/325 |
| 3,034,594 A | * | 5/1962 | Menzel et al. ................ 367/49 |
| 3,815,407 A | * | 6/1974 | Lavery ........................ 73/582 |
| 4,056,163 A | * | 11/1977 | Wood et al. ................ 181/113 |
| 4,150,568 A | * | 4/1979 | Berger et al. ............. 73/152.47 |
| 4,369,506 A | | 1/1983 | Benzing |
| 4,419,748 A | | 12/1983 | Siegfried, II |
| 4,686,653 A | * | 8/1987 | Staron et al. ............. 340/856.2 |
| 4,709,362 A | | 11/1987 | Cole |
| 4,802,144 A | | 1/1989 | Holzhausen et al. |
| 4,874,061 A | | 10/1989 | Cole |
| 5,121,363 A | | 6/1992 | Benzing |
| 5,138,875 A | * | 8/1992 | Booer ...................... 73/152.47 |

(Continued)

OTHER PUBLICATIONS

Novascone et al., "Driving point impedance and physical property logging," Technical Program of the Society of Exploration Geophysicists (SEG) Exposition and Seventy-Second Annual meeting vol. II pp. 2467-2470, Jan. 1, 2002.

(Continued)

*Primary Examiner*—Hezron Williams
(74) *Attorney, Agent, or Firm*—TraskBritt, P.C.

(57) ABSTRACT

Methods and an apparatus for determining at least one characteristic of an environment are disclosed. A vibrational energy may be imparted into an environment and a magnitude of damping of the vibrational energy may be measured and at least one characteristic of the environment may be determined. Particularly, a vibratory source may be operated and coupled to an environment. At least one characteristic of the environment may be determined based on a shift in at least one steady-state frequency of oscillation of the vibratory source. An apparatus may include at least one vibratory source and a structure for positioning the at least one vibratory source proximate to an environment. Further, the apparatus may include an analysis device for determining at least one characteristic of the environment based at least partially upon shift in a steady-state oscillation frequency of the vibratory source for the given impetus.

58 Claims, 13 Drawing Sheets

U.S. PATENT DOCUMENTS

| | | | | |
|---|---|---|---|---|
| 5,141,061 A | * | 8/1992 | Henneuse | 175/56 |
| 5,226,332 A | * | 7/1993 | Wassell | 73/152.58 |
| 5,229,552 A | | 7/1993 | Cole | |
| 5,234,056 A | * | 8/1993 | Bodine et al. | 166/301 |
| 5,273,122 A | * | 12/1993 | Henneuse | 175/26 |
| 5,321,213 A | | 6/1994 | Cole et al. | |
| 6,227,044 B1 | * | 5/2001 | Jarvis | 73/152.47 |
| 6,488,117 B1 | * | 12/2002 | Owen | 181/121 |
| 6,868,035 B2 | * | 3/2005 | West | 367/25 |
| 2002/0179364 A1 | * | 12/2002 | Bussear et al. | 181/108 |

OTHER PUBLICATIONS

Reynolds et al., "Propagation from a Fluid-Encased Vibrator in an Elastic Continuum," Presented at the XXI Southeastern Conference on Experimental and Applied Mechanics, University of Central Florida, Orlando, FL, May 19-21, 2002.

* cited by examiner

APPARATUS AND METHODS FOR DETERMINING AT LEAST ONE CHARACTERISTIC OF A PROXIMATE ENVIRONMENT

GOVERNMENT RIGHTS

The United States Government has rights in the following invention pursuant to Contract No. DE-AC07-99ID13727 between the U.S. Department of Energy and Bechtel BWXT Idaho, LLC.

FIELD OF THE INVENTION

The present invention relates to methods and apparatus for determining at least one characteristic of a medium or environment by way of vibrational energy. More specifically, at least one characteristic of an environment may be determined by imparting vibrational energy thereinto by way of a vibratory source.

BACKGROUND OF THE INVENTION

Generally, determination of at least one characteristic of an environment proximate to a vibratory source may be important for any number of reasons. For example, it is often of interest to ascertain at least one characteristic of an environment proximate to pipes, conduits, ducts, or other structural elements that extend within or proximate to a region of interest such as, a petroleum well, a hazardous waste site, a coal bed, or any other region of interest.

For instance, identification of subsurface rock properties may be valuable in oil well production since properties such as porosity and permeability may influence oil recovery. Conventional methods may employ correlations based upon acoustic travel times and bulk density to measure rock properties such as bulk compressibility, shear modulus, Young's modulus, and Poisson's ratio. Additional conventional methods may employ magnetic resonance or resistivity measurements for determining rock properties. Alternatively, other conventional methods directly measure rock properties through testing of samples that are taken from the well location and transported to a laboratory. However, such testing may be relatively difficult and time consuming, may only approximate in situ conditions, and may also be expensive.

Alternative conventional methods may employ an orbital vibrator for providing a seismic signal or wave from which a property of a subterranean formation may be determined. The use of orbital vibrators as seismic waveform generators is well known in the area of geophysical prospecting for oil, or the like. Typically, an orbital vibrator may take the form of an eccentric rotating mass enclosed within a shell or tube which may be used in various combinations to generate the desired seismic signal(s). Examples of orbital vibrators are disclosed by U.S. Pat. No. 4,709,362 to Cole, U.S. Pat. No. 4,874,061 to Cole, U.S. Pat. No. 5,229,552 to Cole, and U.S. Pat. No. 5,321,213 to Cole.

In addition, U.S. Pat. No. 4,419,748 to Siegfried, discloses a continuous wave sonic logging method in which a continuous sine wave at a single frequency is emitted and received, and a spatial Fourier transform is performed over the receiver array. The resulting spatial frequency components are then used to indicate the velocities of various sonic paths. This would require numerous logging runs for the dispersive waves, for which the wave characteristics are functions of frequency. Since the logging time is a costly factor in wire line logging services, the method is not practical for logging dispersive waves.

U.S. Pat. No. 4,874,061 to Cole, mentioned above, relates to an apparatus for simultaneously generating elliptically polarized seismic shear waves and compression waves downhole for performing reverse vertical seismic profiles. The apparatus includes an elongate frame for support in the borehole and the frame includes a drive means energizable to impart an orbital motion to at least a portion of the frame to generate an orbital shear wave.

U.S. Pat. No. 2,244,484 to Beers relates to a method for seismically determining physical characteristics of subsurface formations which includes generating a sound in the vicinity of a formation. More specifically, a method of seismically determining physical characteristics of geologic strata is disclosed which includes propagating sound waves in the immediate vicinity of the formation or stratum, measuring the velocity of propagation of the sound through the formation and indicating the velocity at the surface. The characteristics of the formation may be readily determined by measuring the time required for the waves to travel through the formation.

U.S. Pat. No. 4,802,144, to Holzhausen et al. discloses a method employing a principle that the growth of a hydraulic fracture increases the period of free oscillations in the well connected to the fracture. Holzhausen discloses that hydraulic fracture impedance can be defined in terms of the hydraulic resistance and the hydraulic capacitance of a fracture. Further, fracture impedance can be determined directly by measuring the ratio of down hole pressure and flow oscillation or indirectly from well head impedance measurements using impedance transfer functions. Because impedance is a function of fracture dimensions and the elasticity of the surrounding rock, impedance analysis of a seismic wave emanating from the borehole can be used to evaluate the geometry of the fracture by analyzing the data which results from free and forced oscillations in the well, and looking for a match between the data and theoretical models of projected shapes of the fracture.

U.S. Pat. No. 5,121,363 to Benzing discloses a method for identifying fractured rock formations and determining their orientation by employing two orthogonal motion sensors which are used in conjunction with a downhole orbital vibrator. The downhole vibrator includes a device for orienting the sensors. The output of the sensors is displayed as a lissajou figure, wherein the shape of the figure may change responsive to encountering a subsurface fracture by the apparatus. Thus, the apparatus and method may be used to identify fractured rock formations and may enable determination of the azimuthal orientation of the fractures.

In view of the foregoing, it would be advantageous to provide improved methods and apparatuses which facilitate determination of at least one property of an environment proximate to a vibratory source.

BRIEF SUMMARY OF THE INVENTION

The present invention relates to a method of determining at least one characteristic of an environment. Particularly, a vibratory source may be operated proximate to an environment and coupled thereto so as to exhibit at least one steady-state oscillation frequency for an associated at least one impetus. Further, the at least one steady-state oscillation frequency of the vibratory source may be indicated and a maximum steady-state oscillation frequency of the vibratory source for the associated at least one impetus may be determined. At least one characteristic of the environment proximate to the vibratory source may be determined based at least in part on the at least one steady-state frequency of oscillation of the vibratory source in relation to the maximum steady-state oscillation frequency of the vibratory source. Such a method may provide a relatively easy and straightforward process for determining at least one characteristic of a proximate environment.

Another aspect of the present invention relates to a method of determining at least one characteristic of an environment. More specifically, a vibrational energy may be imparted into an environment (e.g., through an acoustic medium or other coupling) and a magnitude of damping of the vibrational energy by way of the environment may be measured. Further, at least one characteristic of the environment may be determined based at least in part on the magnitude of damping.

Optionally, at least one vibratory source may be moved during operation so as to interact with different regions of a proximate environment. Also, at least one operational characteristic of a vibratory source may be selected for preferential interaction with a selected region of a proximate environment. For instance, a steady-state oscillation frequency of the vibratory source may be selected or altered for preferential interaction with a selected region of a proximate environment. Further, a vibratory source may be structured for at least one type of vibration. For instance, a vibratory source may comprise at least one of an imbalanced rotating device and a single-axis vibrator. In addition, a vibratory source may be oriented for directing vibrational energy toward a selected region of a proximate environment.

The present invention also relates to an apparatus for determining at least one characteristic of an environment. The apparatus may include at least one vibratory source and a structure for positioning the at least one vibratory source proximate to an environment. Further, the apparatus may include an analysis device for determining at least one characteristic of the environment based at least partially upon an actual steady-state oscillation frequency of a vibratory source for a given impetus of the at least one vibratory source during operation in comparison to a maximum steady-state oscillation frequency of the vibratory source for the given impetus.

BRIEF DESCRIPTION OF THE DRAWINGS

While the specification concludes with claims particularly pointing out and distinctly claiming that which is regarded as the present invention, the advantages of this invention can be more readily ascertained from the following description of the invention when read in conjunction with the accompanying drawings in which:

FIG. 1I shows a vibratory source positioned within a borehole and configured for oscillating along a vibration axis;

DETAILED DESCRIPTION OF THE INVENTION

Figure 1A:
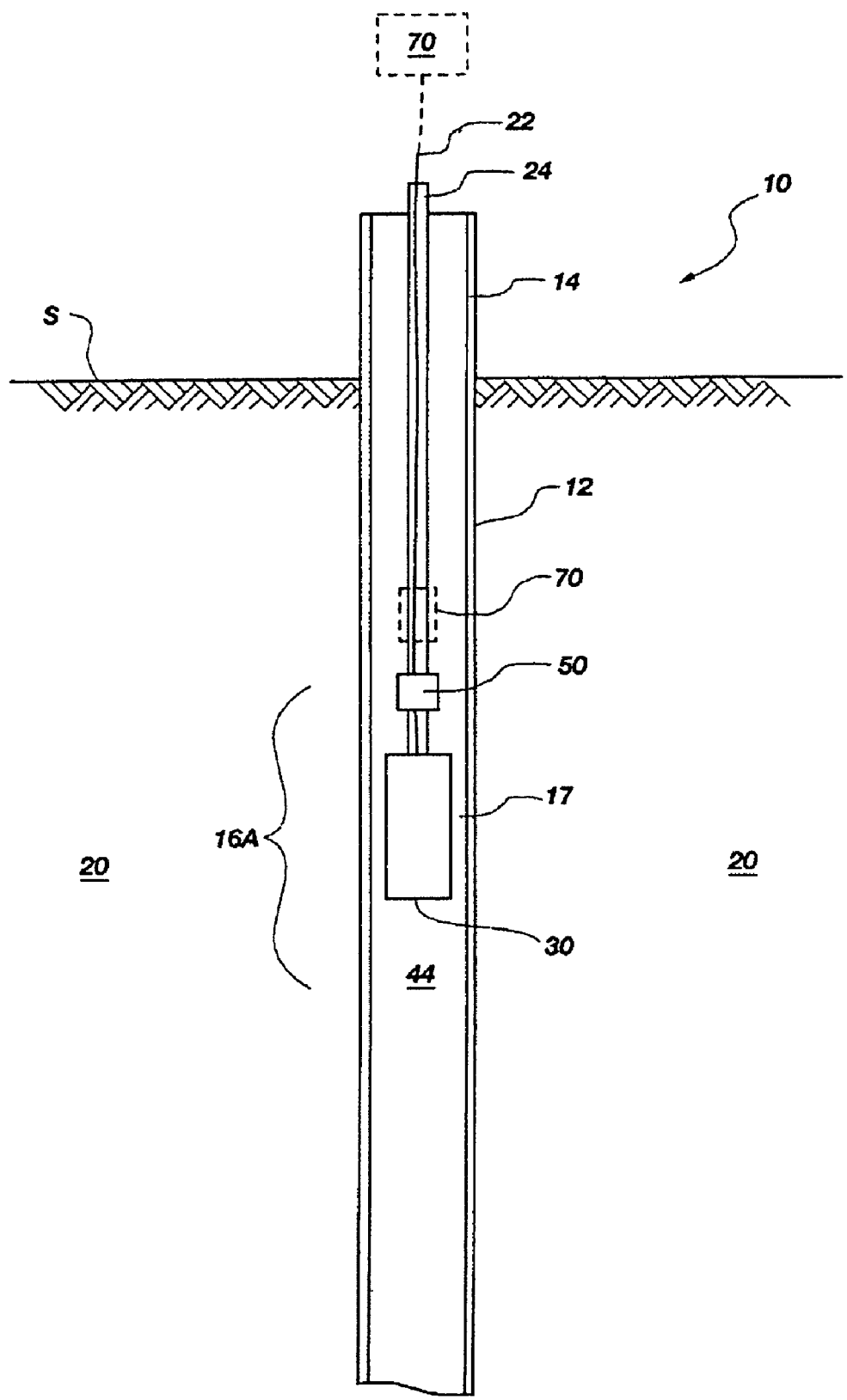
FIG. 1A shows a schematic side view of an apparatus including a vibratory source positioned within a borehole.

The present invention relates to use of vibrational energy for determining at least one characteristic of an environment with which the vibrational energy interacts. For example, a vibrational source may be positioned proximate an environment for indicating at least one characteristic thereof. As used herein, "proximate," with regard to surroundings of a vibratory source, means within the substantial influence of a vibrational energy (e.g., generated by operation of the vibratory source). Thus, "proximate," indicates a discernible region of surroundings of a vibratory source or vibrational energy, which may depend upon the oscillation magnitude and frequency thereof.

It has been discovered by the inventors herein that the steady-state operation (i.e., operation at a substantially constant speed for a given, substantially unchanging impetus) of a vibratory source (e.g., an orbital vibrator) may indicate at least one characteristic of a proximate environment proximate thereto. Explaining further, the operation of a vibratory source coupled to a dissipative medium or device is influenced by a damping or resistance to the vibratory displacement or vibrational energy generated by the vibratory source. An acoustic medium, as used herein, refers to a material capable of transmitting vibrational energy (e.g., a solid, a gas, a liquid, a plasma, or combinations thereof). Such damping or resistance may also be termed "dissipation" and may cause an observable shift in the steady-state oscillation frequency thereof, as explained in greater detail hereinbelow. As used herein, the term "dissipation" refers to any and all characteristics or phenomena that may influence the steady-state oscillation frequency of a vibratory source.

For instance, in the case of a vibratory source comprising an imbalanced rotating device, a dissipation of a vibratory motion thereof may cause an observable shift or change in a steady-state oscillation frequency of a vibratory source, in relation to a maximum or theoretical steady-state oscillation frequency that would otherwise be observed (i.e., in a vacuum; as if external forces were not present). Further, a shift in the steady-state oscillation frequency oscillation frequency of the vibratory source may be correlated to at least one characteristic of the proximate environment. As used herein a "shift" in frequency of a vibratory source refers to a steady-state oscillation frequency of a vibratory source for a given impetus in comparison to a maximum (e.g., actual or theoretical) steady-state oscillation frequency that would otherwise be observed for the same impetus (i.e., without dissipation).

It may be appreciated that the present invention contemplates that methods in accordance therewith may be employed in various environments and for indication of various characteristics of a proximate environment. One environment to which the present invention may pertain is a subterranean borehole. More particularly, the properties of a subterranean formation in which a borehole is formed may be of interest for many reasons, including, but not limited to, hazardous waste remediation, oil and gas exploration/production, coal and methane exploration/production, mineral exploration/production, hydrology, and seismology. For example, as described in further detail herein, FIG. 1E shows experimental data relating to operation of an orbital vibrator at different steady-state oscillation frequencies within a subterranean formation comprising shale or limestone (i.e., a borehole formed therein), respectively.

Accordingly, while the present invention may be described in relation to a particular application or environment, such description is not limiting to the present invention; rather, such description is merely exemplary with regard thereto. Thus, while certain embodiments of the present invention may be described in relation to indicating at least one characteristic of a subterranean formation, it should be understood that methods of the present invention may be used for determining at least one characteristic of an environment proximate to a vibratory source, without limitation.

FIG. 1A shows an apparatus 10 of the present invention, including a vibratory source 30, which may be placed proximate a region of interest, such as subterranean formation 20. As shown in FIG. 1A, a subterranean borehole 12 may be formed within subterranean formation 20 into surface S thereof. Optionally, a tubular member 14 may be positioned within the subterranean borehole 12, as known in the art. Also as known in the art, cement (not shown) may be positioned about (i.e., generally surrounding) tubular member 14 for affixing the tubular member 14 within the borehole 12. In addition, the borehole 12 or the tubular member 14, if present, may be filled with an acoustic medium 44 such as, for example, drilling mud, oil, water, air, or combinations thereof. As shown in FIG. 1A, annulus 17, formed between the tubular member 14 and the vibratory source 30, is also filled with acoustic medium 44. It is further noted that, while not shown, in order to form borehole 12, a number of devices and structures which are well known by those of ordinary skill in the art may be employed for forming borehole 12, placing tubular member 14 therein, or both. Such devices and structures may include, for example, a drilling platform, a drilling rig, a rotary drill bit, drilling fluid pumps, and various control units.

The vibratory source 30, which may comprise, for instance, an orbital mass vibrator, may be placed within the interior of the tubular member 14 and positioned proximate a region 16A of the subterranean formation 20. The vibratory source 30 may be deployed within borehole 12 by way of an appropriately sized and configured structural member 24, such as, for example, a tubing string or cable to support and position the vibratory source 30 and a wireline 22, such as, for example, a seven conductor wireline, electrically coupled with the vibratory source 30 for providing electrical power thereto and electrical communication therewith. Of course, it is contemplated that the vibratory source 30 may be lowered into the borehole 12 by the wireline 22 alone, if the wireline 22 is suitable for doing so. It is also noted that the vibratory source 30 need not be electrically powered, but rather may be hydraulically, pneumatically powered, combustion powered, or powered as otherwise known in the art as may be appropriate for specific applications.

Figure 1B:
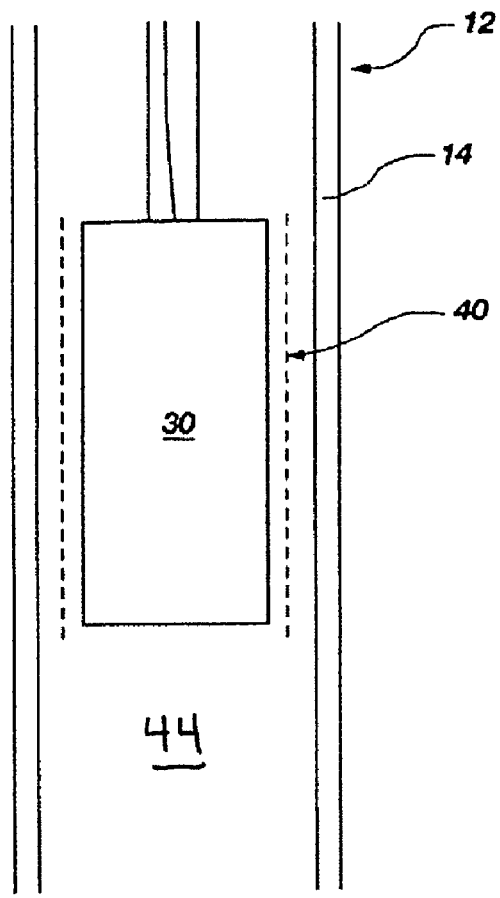
FIG. 1B shows an enlarged view of the vibratory source shown in FIG. 1A, illustrating a displacement envelope thereof.
Figure 1C:
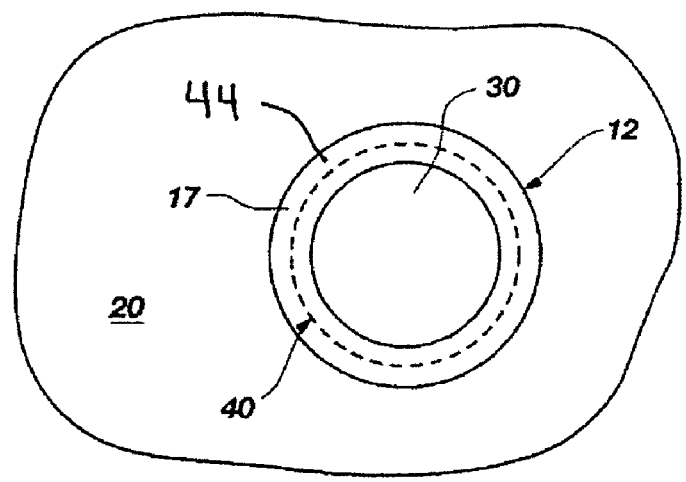
FIG. 1C shows a top elevation view of the vibratory source shown in FIGS. 1A and 1B.
Figure 1D:
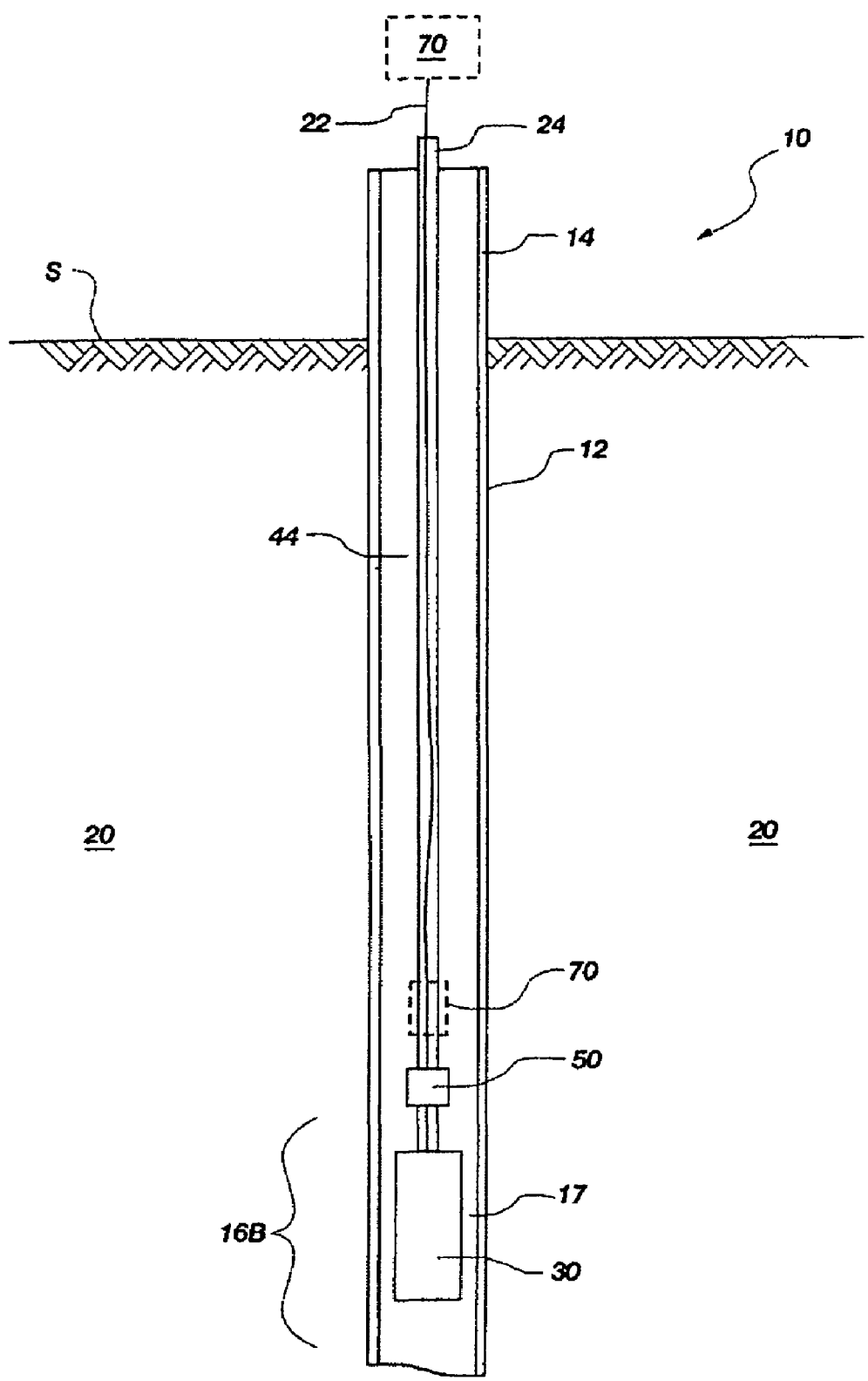
FIG. 1D shows a schematic side view of a vibratory source positioned within a borehole at a different position than as shown in FIG. 1A.
Figure 1E:
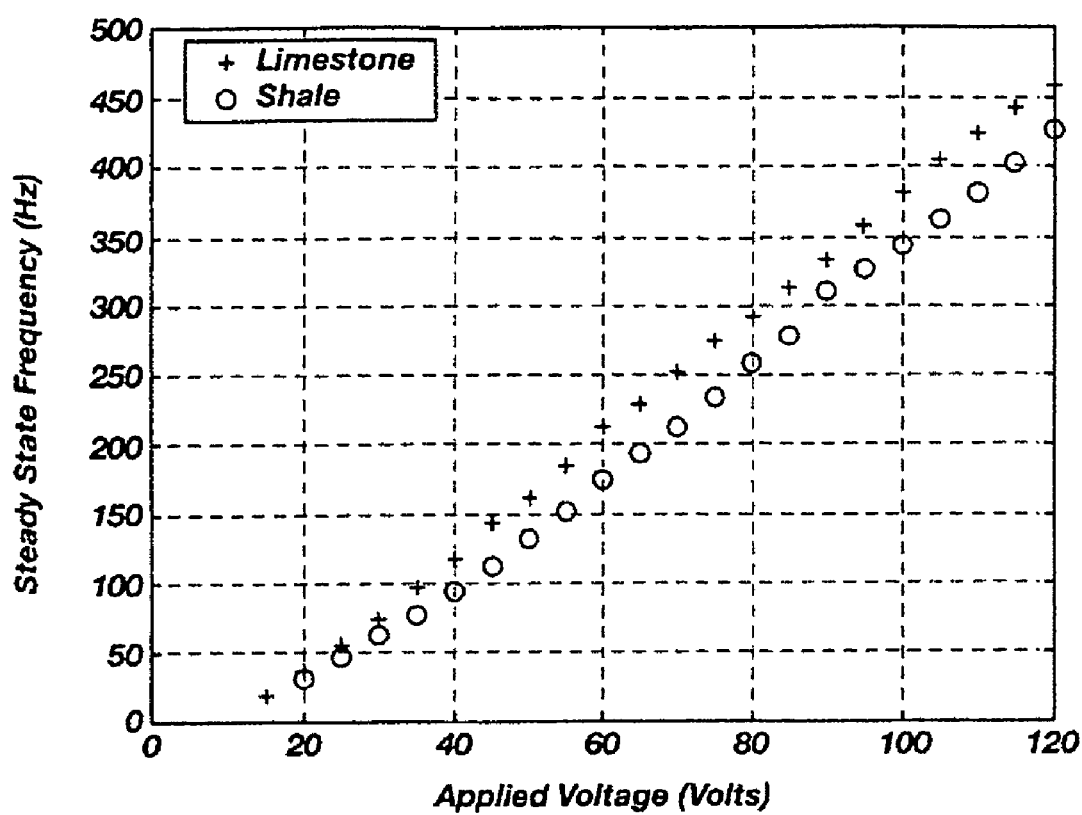
FIG. 1E shows a graph of a steady-state oscillation frequency for an orbital vibrator as a function of voltage.

FIGS. 1B and 1C show an enlarged side view of vibratory source 30 within borehole 12 and a simplified top elevation view of vibratory source 30 within borehole 12, respectively, during operation thereof. Tubular member 14 has been omitted in FIG. 1C for clarity. More particularly, the vibratory source 30 may produce a generally radial vibrational motion generally bounded by a displacement envelope 40 indicated by dashed lines and exaggerated for purposes of illustration. Vibratory source 30 may oscillate in a generally radial fashion about a longitudinal centerline (not shown) thereof or may oscillate about another fixed point, an axis, or a boundary as known in the art and discussed in greater detail herein. Vibratory source 30 may oscillate, during operation, at any frequency at which the vibratory source 30 is capable of operating, without limitation. For example, frequencies ranging, for example, from below 1 Hertz to several thousand Hertz. As shown in FIG. 1E, one range of steady-state oscillation frequencies of a vibratory source may be between about 20 Hertz to 450 Hertz.

As mentioned above, annulus 17 between the vibratory source 30 and the tubular member 14 may be filled with an acoustic medium 44. If acoustic medium 44 comprises a fluid, a fluid coupling may exist between the vibratory source 30 and tubular member 14 through the acoustic medium 44, thus transferring vibrational energy to the tubular member 14 and into the subterranean formation 20 during operation of vibratory source 30. Similarly, on the other hand, if acoustic medium 44 comprises a gas, a gas coupling may exist between the vibratory source 30 and tubular member 14 through the acoustic medium 44, thus transferring vibrational energy to the tubular member 14 and into the subterranean formation 20 during operation of vibratory source 30.

It should also be understood that the present invention contemplates that the acoustic medium 44 may be selected with regard to its ability to transfer vibrational energy from a vibratory source to a proximate environment. Put another way, different acoustic mediums may transfer vibrational energy at different efficiencies. For instance, in the case of an acoustic medium comprising a fluid, at least one property (e.g., a density, a viscosity, or a speed of an acoustic wave therethrough) of the acoustic medium may be chosen in relation to a transfer property thereof. In another example, in the case of an acoustic medium comprising a solid, at least one property (e.g., a density, a modulus of elasticity, or a speed of an acoustic wave therethrough) of the acoustic medium may be chosen in relation to a vibrational energy transfer property thereof.

Thus, for example, when operating vibratory source 30, the tubular member 14 may be influenced (e.g., displaced or deformed) by the vibration thereof at substantially the same frequency as the vibratory source 30. While the actual amount of displacement of the tubular member 14 may be relatively small (and thus the stresses and strains imposed on the tubular member may be correspondingly small), the energy transfer to the subterranean formation 20 may be substantial.

The inventors herein have discovered that interaction of vibrational energy communicated from a vibratory source 30 into a proximate environment, (e.g., subterranean formation 20) may perceptibly influence the steady-state operational (oscillation) frequency of the vibratory source 30. Specifically, interaction in the form of dissipation with a proximate environment may perceptibly reduce (i.e., shift) the steady-state oscillation frequency of vibratory source 30. Further, such a perceptible reduction or shift of the steady-state oscillation frequency of the vibratory source 30 may be indicative of (or correlated with respect to) at least one characteristic of a proximate environment. Further, as discussed hereinbelow in greater detail, aspects of the vibratory source 30 may influence the shift of the steady-state oscillation frequency thereof via internal or intrinsic dampening.

For instance, dissipation may be related to damping or energy absorption, which may affect a steady-state oscillation frequency of the vibratory source 30. One property that may reduce the steady-state oscillation frequency of the vibratory source 30 may be the bulk modulus of the subterranean formation 20. Other characteristics, for example, that may reduce the steady-state oscillation frequency of the vibratory source 30 in comparison to a maximum steady-state oscillation frequency thereof may include a modulus of elasticity and a density of subterranean formation 20. In a fluid domain, dissipation may be proportional to mass density and sound speed therein. In addition, the presence or absence of liquid within subterranean formation 20 may substantially affect the steady-state oscillation frequency of the vibratory source 30.

Implicitly, at least one characteristic of an environment proximate a vibratory source may be indicated by or correlated to a steady-state oscillation frequency shift thereof. Put another way, generally, a shift in a steady-state oscillation frequency of the vibratory source 30 coupled to an environment through an acoustic medium may indicate at least one characteristic of a region of the environment. Thus, in a method according to the present invention, at least one characteristic of an environment to which a vibratory source is coupled through an acoustic medium may be indicated by operation thereof within the acoustic medium. More particularly, at least one characteristic of an environment proximate a vibratory source may be indicated by analyzing a steady-state oscillation frequency thereof in relation to a maximum or theoretical steady-state oscillation frequency thereof.

In one method of the present invention, a vibratory source may be operated and at least one actual steady-state oscillation frequency (for a given, substantially constant impetus) may be measured or otherwise indicated. It should be noted that during operation of a vibratory source, only a minimal amount of time may be required to establish a steady-state oscillation frequency. That is, the impetus to a vibratory source may remain substantially constant only so long as to establish a steady-state oscillation frequency, if desired. Further, a maximum steady-state oscillation frequency (for the given, substantially constant impetus) may be, after determination thereof, compared to or otherwise analyzed with respect to at least one actual steady-state oscillation frequency to determine a magnitude of the steady-state oscillation frequency shift.

Accordingly, as shown in FIG. 1A, a vibratory source 30 may be positioned proximate a region of interest and operated. Further, a motion sensor 50, such as a geophone, or another sensor as known in the art for detecting the vibration or displacement of vibratory source 30 may be positioned within a region of influence thereof (e.g., a region within which the vibrations are detectable). Motion sensor 50 may be carried by the vibrational source 30, positioned within borehole 12, or affixed to structural member 24 (as shown in FIG. 1A), for sensing the vibration or displacement of vibratory source 30.

Data communicated from and, optionally, stored or otherwise memorialized, by way of motion sensor 50 may be analyzed to indicate an actual steady-state oscillation frequency of vibratory source 30. For instance, a fast-Fourier transform (FFT) may be performed upon the data supplied or collected via motion sensor 50 to indicate a steady-state oscillation frequency of a vibratory source 30. Other sensors as known in the art may be employed for indicating an actual steady-state oscillation frequency of vibratory source 30. For example, motion sensor 50 may comprise a pressure transducer or an accelerometer, which may be within the influence of the vibratory source 30 for indicating the oscillation thereof. In one example, if vibratory source 30 comprises an imbalanced rotating device, an encoder (e.g., optical or otherwise) may be employed to measure the rotation speed of the electric motor. Of course, any suitable transducer or sensor as known in the art may be employed for indicating or measuring the actual steady-state oscillation frequency of the vibratory source 30.

In order to correlate a steady-state oscillation frequency shift with at least one characteristic of a proximate environment, a steady-state oscillation frequency shift must be determinable or quantifiable. In turn, a maximum steady-state oscillation frequency of a vibratory source should be known, determined, or quantifiable. In one approach, a maximum steady-state oscillation frequency of a vibratory source may be determined via empirical techniques (i.e., experimentation or observation). Additionally, empirical techniques may be employed for correlating a steady-state oscillation frequency shift with at least one characteristic of a proximate environment. Alternatively, a maximum or theoretical steady-state oscillation frequency of a vibratory source may be predicted via simulation or modeling. Of course, a combination of empirical and experimental techniques may be employed for determining a maximum or theoretical steady-state oscillation frequency of a vibratory source.

In addition, an analysis device 70 may occupy at least one of two positions shown in FIG. 1A. For example, analysis device 70 may be positioned within borehole 12 for determining at least one characteristic of an environment based at least partially upon an actual steady-state oscillation frequency of the vibratory source 30 during operation in comparison to a maximum steady-state oscillation frequency of the vibratory source 30. In more detail, analysis device 70 may be electrically (operably) coupled to motion sensor 50 through wireline 22 or another communication path as known in the art. Further, analysis device 70 may be electrically coupled (e.g., powered, etc.) to additional equipment or devices proximate surface S of the subterranean formation 20 and may communicate therewith substantially in real time (i.e., substantially instantaneously). Alternatively, analysis device 70 may collect, analyze, or both collect and analyze at least one signal supplied from motion sensor 50. Of course, analysis device 70 may store (within a memory or other storage mechanism or media) data so collected or generated. Accordingly, analysis device 70 may comprise a computing device, such as a computer, microcomputer, or the like. Alternatively, other analysis techniques may be employed for correlating a signal from motion sensor 50 to at least one characteristic of a proximate environment, as known in the art. For example, an electrical circuit may be designed for accepting a signal from motion sensor 50 and communicating a signal relating to at least one characteristic of a proximate environment. Analysis device 70 may be, optionally, positioned outside of borehole 12, as shown in FIG. 1A, and may be utilized for determining at least one characteristic of an environment by way of analyzing a signal or data supplied from motion sensor 50, as explained above. Of course, a plurality of analysis devices 70 may be provided for analyzing, storing, or both analyzing and storing data supplied from motion sensor 50 or other sensors included within apparatus 10.

Further, simulation or modeling may be employed for correlating at least one characteristic of an environment proximate to a vibratory source exhibiting a steady-state oscillation frequency shift. In one example, mathematical simulation or modeling may be performed with respect to a vibratory source, for instance, such as a direct current motor that rotates in response to electrical current passing therethrough. Theoretical modeling and analysis have been performed with regard to operation of a direct current motor powering a vibratory source within an acoustic medium, as shown hereinbelow. Also, theoretical modeling may be useful for predicting a steady-state maximum oscillation frequency (e.g., when the vibratory source is free from external forces, such as for instance, in a vacuum).

While mathematical equations and approximations may be employed for performing, enhancing, understanding, and optimizing aspects of the present invention, the following mathematical modeling, analysis, and approximation should not be limiting to the present invention; rather, the following mathematical analysis is but one example of concepts related to the present invention. Particularly, at least one equation of motion may be formulated based upon Newton's second law of motion relating to operation of a vibratory source, such as an imbalanced rotating device within an acoustic medium, wherein the imbalanced rotating device is powered by way of a direct-current motor. The following Equations 1-3 are examples of formulations of Newton's second law of motion, with respect to a vibratory source comprising an electrical motor-driving imbalanced vibrator, relating to a polar coordinate system, an x direction in a Cartesian coordinate system, and a y direction in the Cartesian coordinate system, respectively:

$$J\ddot{\theta} + me^2\ddot{\theta} - me\ddot{x}\sin(\theta) + me\ddot{y}\cos(\theta) = \frac{k_T V_o - k_T k_B \dot{\theta}}{R_o} - k_f \dot{\theta} \quad \text{Equation 1}$$

$$-me\ddot{\theta}\sin(\theta) + (m + m_s + m_r)\ddot{x} + b\dot{x} = me\dot{\theta}^2\cos(\theta) \quad \text{Equation 2}$$

$$me\ddot{\theta}\cos(\theta) + (m + m_s + m_r)\ddot{y} + b\dot{y} = me\dot{\theta}^2\sin(\theta) \quad \text{Equation 3}$$

Where:
J is the polar moment of inertia of the rotor;
m is the mass of the rotor;
$m_s$ is the mass of the stator;
$m_r$ is the radiation mass coefficient;
e is the eccentricity of the rotor;
b is the damping coefficient;
$V_0$ is the voltage applied to the windings of the DC motor;
$R_0$ is the total DC resistance of the motor windings and attached lead wires;
$k_B$ is the back-emf coefficient of the DC motor;
$k_f$ is the coefficient of frictional torque acting between the rotor and the stator of the DC motor;
$k_T$ is the DC motor torque constant; and
θ is the relative rotational position of the rotor.

With respect to Equations 1-3, voltage $V_0$ is an input and x, y, and θ are unknowns. One approach for solving Equations 1-3 for predicting or simulating the behavior (e.g., predicting or simulating a steady-state oscillation frequency) of an electrical motor-driven imbalanced rotating vibrator may be to numerically integrate Equations 1-3 (the equations of motion). Such numerical integration is well known in the art, and commercially available software may have built-in functionality for performing such integrations. For instance, MATLAB™ software, commercially available from The MathWorks, Inc. of Natick, Mass., includes functionality (e.g., Runge-Kutta methods, Euler methods, etc.) for performing numerical integration. Alternatively, numerical integration may be performed by constructing a program or methodology within a mathematical analysis software, such as MATLAB™, or another mathematical analysis software as known in the art.

Alternatively, as outlined hereinbelow, an approximate solution to the above-listed equations may be obtained via a perturbation analysis followed by a time-averaging operation. For instance, the form of perturbed x(t), y(t), and θ(t) may be adopted or assumed as follows:

$$x(t) = \epsilon x_1(t) + \epsilon^2 x_2(t) + O(\epsilon^3) \quad \text{Equation 4}$$

$$y(t) = \epsilon y_1(t) + \epsilon^2 y_2(t) + O(\epsilon^3) \quad \text{Equation 5}$$

$$\theta(t) = \omega t + \epsilon \theta_1(t) + \epsilon^2 \theta_2(t) + O(\epsilon^3) \quad \text{Equation 6}$$

Where:
$\epsilon = m/M$; and
M is the total mass of the orbital vibrator.

Further, substituting Equations 4-6 into equations 1-3, motions for $x_1$ and $y_1$ may be determined, and applying a time-averaging operation to an expanded form of Equation 1 may be represented as follows:

$$-\epsilon^2 \overline{e\ddot{x}_1 \sin(\omega t)} + \epsilon^2 \overline{e\ddot{y}_1 \cos(\omega t)} = \quad \text{Equation 7}$$
$$\frac{k_T V_o}{R_o M} - \frac{k_B k_T}{R_o M}\omega - \frac{k_f}{M}\omega + O(\epsilon^3)$$

Where the overbars indicate time-averaging operations.

Further, assuming b is small, the above equation may be simplified to:

$$\frac{\epsilon^2 b M e^2 \omega}{(M + m_r)^2} = \frac{k_T V_o}{MR_o} - \frac{k_B k_T}{MR_o}\omega - \frac{k_f}{M}\omega \quad \text{Equation 8}$$

The steady-state oscillation frequency ω may be solved from the above-equation as:

$$\omega = \frac{\frac{k_T V_o}{R_o}}{\frac{k_B k_T}{R_o} + k_f} - \frac{\varepsilon^2 e^2 \omega b M^2}{\left(\frac{k_B k_T}{R_o} + k_f\right)(M + m_r)^2} \quad \text{Equation 9}$$

Further, the maximum steady-state oscillation frequency $\omega_0$ when nonlinearities are ignored may be given by:

$$\omega_o = \frac{\frac{k_T V_o}{R_o}}{\frac{k_B k_T}{R_o} + k_f} \quad \text{Equation 10}$$

Further, a constant K may be defined as:

$$K = \frac{e^2 b R_o M^2}{k_T V_o (M + m_r)^2} \quad \text{Equation 11}$$

Using both Equation 10 and Equation 11, Equation 9 may be simplified as:

$$\omega = \frac{\omega_o}{1 + \varepsilon^2 K \omega_o} \quad \text{Equation 12}$$

Further, assuming that the frequency shift is small, one may approximate Equation 12 as follows:

$$\omega = \quad \text{Equation 13}$$

$$\frac{\omega_o}{1 + \varepsilon^2 K \omega_o} \approx \omega_o - \varepsilon^2 K \omega_o^2 = \omega_o - \frac{(me)^2}{(M + m_r)^2} \frac{b}{k_T(V_o/R_o)} \omega_o^2$$

Rearranging Equation 13 and substituting $\omega_0$ from Equation 10 gives:

$$\omega \approx \omega_o \left[ 1 - \frac{(me)^2}{(M + m_r)^2} \frac{b}{\frac{k_B k_T}{R_o} + k_f} \right] \quad \text{Equation 14}$$

As evidenced by Equation 14, mathematical simulation or modeling may correlate at least one characteristic of an environment to a steady-state oscillation frequency shift of a vibratory source. Particularly, damping b relates to at least one characteristic of an environment proximate the presumed vibratory source. Further, the mass and eccentricity of the imbalanced rotating vibrator may relate to mechanical characteristics that may be selected (i.e., in designing an imbalanced rotating vibrator) for optimizing a steady-state oscillation frequency shift during use thereof. Similarly, electrical characteristics $k_B$, $k_f$, and $k_T$ may be considered in the design of an imbalanced rotating vibrator for optimizing a steady-state oscillation frequency shift during use thereof. Further, a maximum steady-state oscillation frequency of a vibratory source may be predicted via mathematical modeling, as outlined above.

It should be appreciated that the above equations are merely examples of one approach for simulating or analyzing at least one equation of motion for a specific vibrational source, namely, an imbalanced rotating device. Thus, many variations, modifications, extrapolations, different assumptions, different conditions, or other phenomena may be considered, included, or otherwise addressed in the formulation, approximation, or solution of at least one equation of motion for a specific vibrational source (e.g., a DC motor-driven, imbalanced rotating device). The present invention encompasses differing simulation or modeling approaches, which would be suitable for a DC motor-driven, imbalanced rotating device or any alternative vibrational sources as would be obvious to one of ordinary skill in the art.

Thus, in one aspect of the present invention, a frequency shift or difference between a maximum steady-state oscillation frequency and another steady-state oscillation frequency, of a vibratory source may be ascertained. Additionally, modeling, simulation, or empirical methods may be employed to predict a maximum steady-state oscillation frequency of a vibratory source. Additionally, as shown in Equation 14, for instance, a frequency shift may be correlated, through modeling, to at least one characteristic of a proximate environment. Particularly, damping coefficient b may be indicative of at least one characteristic of an environment proximate to a vibratory source, or may be in and of itself, a characteristic of a proximate environment.

Further, such prediction, simulation, or modeling may be useful for designing a vibrational source having desired operational characteristics. For example, analysis of the Equation 14 shows that the frequency shift includes two factors. A first factor indicates that frequency shift is proportional to the square of the product of eccentricity e and $m_e$ divided by the total mass of the device M. A second factor indicates that frequency shift may depend upon a damping (i.e., b) or dissipation component of an environment in communication therewith. Further, the damping or dissipation component may be compared to the total damping effect of the DC motor, including damping via back-emf effects.

Generally, increasing or maximizing the frequency shift may result in better resolution or sensitivity (i.e., relative magnitude of change in the steady-state oscillation frequency shift in relation to a magnitude of change in at least one characteristic of a proximate environment) of the steady-state oscillation frequency of a vibratory source with respect to determining at least one characteristic of a proximate environment. Thus, in one aspect of the present invention, in order to design a DC motor-driven, imbalanced rotating device (e.g., an orbital vibrator), the above analysis (culminating with Equation 14) predicts that increasing a magnitude of eccentricity and the mass of the rotor, in combination with a relatively low-loss (i.e., low damping) electric motor results in increasing a frequency shift thereof for a substantially constant impetus (voltage) supplied thereto. Also, generally, as the impetus (voltage) supplied to the DC motor increases, the frequency shift increases. Thus, operating a vibratory source at a relatively high impetus (voltage, pressure, etc.) may be advantageous for increasing a relative magnitude of steady-state oscillation frequency shift of a vibratory source. Put another way, a vibratory source may be designed so as to develop a maximum amount of vibrational energy while having a minimum amount of internal damping or energy losses.

Referring to FIGS. 1A-1C, because subterranean formation 20 may influence the steady-state oscillation frequency of vibratory source 30, the steady-state oscillation frequency thereof may be utilized for indicating at least one characteristic thereof. For instance, the steady-state oscillation frequency of vibratory source 30 may be shifted, in comparison to a maximum steady-state oscillation frequency, by differing amounts in relation to at least one characteristic of the subterranean formation 20. Thus, in one method according to the present invention, a maximum steady-state oscillation frequency of a vibratory source 30 may be predicted by way of at least one of mathematical modeling, simulation, and empirical methods. Further, the vibratory source 30 may be positioned proximate a region 16A of interest, operated, and a steady-state oscillation frequency of the vibratory source may be measured or determined. At least one characteristic of the subterranean formation 20 may be indicated or determined by analyzing the actual steady-state oscillation frequency in relation to the maximum steady-state oscillation frequency.

In another aspect of the present invention, the above-described method may be repeatedly performed at different positions proximate to a region of interest, respectively. For instance, as shown in FIG. 1D, apparatus 10, as shown in FIG. 1A is shown wherein vibratory source 30 is positioned, by way of wireline 22, within the interior of the tubular member 14 proximate a region 16B of the subterranean formation 20. In one method, the vibratory source 30 may be moved from a first position, (i.e., one of region 16A and 16B) and operated until a steady-state oscillation frequency is established and then moved to a second position (i.e., the other of region 16A and 16B) and operated until a steady-state oscillation frequency is established.

Alternatively, as may be appreciated by inspection of FIGS. 1A and 1D, the vibratory source 30 may be positioned in a first position, (i.e., one of regions 16A and 16B) and continuously operated while moving toward a second position (i.e., the other of regions 16A and 16B). The movement of vibratory source 30 between the first position and the second position may be controlled at a suitable rate so as to allow for a steady-state oscillation frequency to become stabilized responsive to a change in at least one characteristic of the subterranean formation 20, if any. Thus, the steady-state oscillation frequency of the vibratory source 30 may be measured during movement of the vibratory source 30 toward the second position. Additionally, the steady-state oscillation frequency may be correlated to at least one characteristic of the subterranean formation 20. In this way, an indication of at least one characteristic of the subterranean formation 20 may be determined along the borehole 12. Determining at least one characteristic of a subterranean formation along at least a portion of the length of a subterranean borehole is commonly termed "logging." Thus, the present invention may provide a relatively robust and straightforward method for logging at least a portion of a subterranean borehole.

In a specific example, a subterranean formation 20A (FIG. 1F) may comprise a particular composition, such as shale, and subterranean formation 20B (FIG. 1F) may comprise a different, particular composition, such as limestone. Thus, by moving a vibratory source 30 between the longitudinal positions as shown in FIGS. 1A and 1D within a borehole 12 formed through each of subterranean formations 20A and 20B, a change in the steady-state oscillation frequency of vibratory source 30 for a substantially constant impetus may indicate the composition of each of subterranean formations 20A and 20B.

In further detail, FIG. 1E illustrates a graph of a steady-state oscillation frequency for an orbital vibrator powered by a DC motor as a function of an applied voltage for a surrounding environment comprising a water-filled borehole comprising limestone and shale, respectively. More particularly, as shown in FIG. 1E, for a given applied voltage, generally, the steady-state oscillation frequency of the orbital vibrator when surrounded by shale is less than the steady-state oscillation frequency of the orbital vibrator when surrounded by limestone. Accordingly, it may be appreciated that a difference (or change) in a steady-state oscillation frequency of a vibratory source may be correlated to a change in composition of a proximate environment (e.g., during movement of the vibratory source). As may be appreciated, such a process may be advantageous for performing logging within, for example, a fluid-filled subterranean borehole.

Figure 1F:
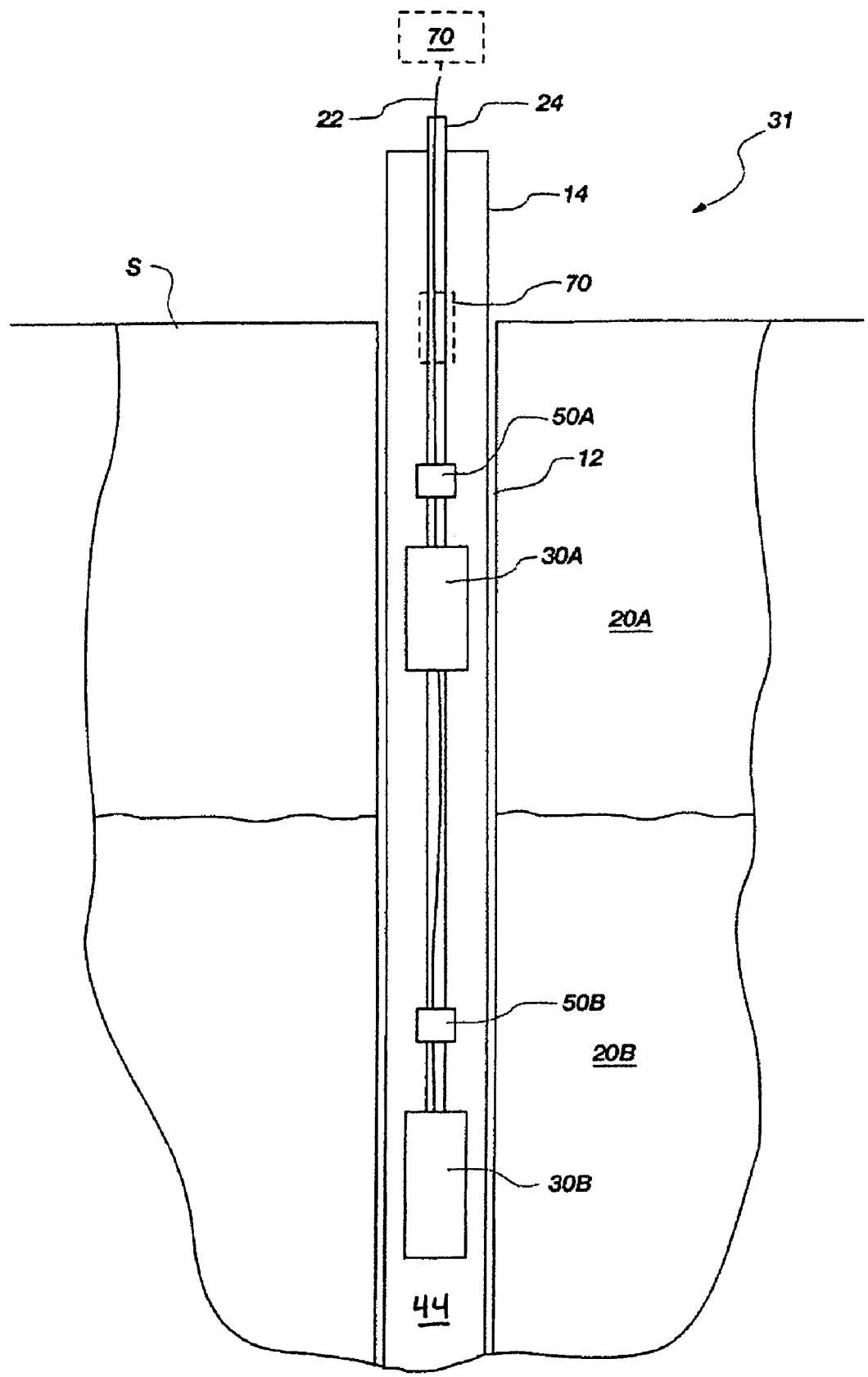
FIG. 1F shows an apparatus including two vibratory sources positioned within a borehole.

In another aspect of the present invention a plurality of vibratory sources may be employed for determining at least one characteristic, individually or substantially simultaneously, of an environment proximate thereto, respectively. For example, apparatus 31 may include vibratory sources 30A and 30B, as shown in FIG. 1F, which may be positioned within borehole 12. Also, motion sensors 50A and 50B may be affixed to structural member 24 and positioned for sensing and collecting data related to the motion of vibratory sources 30A and 30B. Data collected via motion sensors 50A and 50B, respectively, may be subsequently analyzed to indicate the actual steady-state oscillation frequency of the vibratory sources 30A and 30B. For instance, a fast-Fourier transform may be performed upon data supplied or collected via each of motion sensors 50A and 50B for indicating the steady-state oscillation frequency of the vibratory sources 30A and 30B and determining at least one characteristic of subterranean formations 20A and 20B, respectively.

Of course, vibratory sources 30A and 30B may be operated simultaneously, supplied with different, substantially constant impetuses (i.e., operated at different steady-state oscillation frequencies), moved, or combinations thereof, without limitation. As shown in FIG. 1F, vibratory source 30A may be positioned within subterranean formation 20A, comprising a particular composition, such as shale, and vibratory source 30B may be positioned within subterranean formation 20B, comprising a different, particular composition, such as limestone. Thus, the present invention contemplates that a plurality of vibratory sources may be spaced along the length of an apparatus for determining at least one characteristic of a proximate environment of the present invention and positioned within a region of interest. Such a configuration may be advantageous for determining and verifying at least one characteristic of an environment proximate to each of the plurality of vibratory sources, respectively.

Further, each of a plurality of vibratory sources may exhibit different operational characteristics of oscillation, as described in greater detail hereinbelow. Selecting, generally, an operation frequency or other characteristic of oscillation may be advantageous for interaction with a particular region of a proximate environment. More specifically, in another aspect of the present invention, at least one operational characteristic of a vibratory source may be selectively controlled for influencing interaction with a region of a proximate environment. For instance, a particular region of interaction may be selected for indication of at least one characteristic thereof via operation of a vibratory source. In a first aspect of selecting a region of interaction with a vibratory source, an oscillation frequency of the vibratory source may be generally controlled or selected so as to interact with a chosen region of a proximate environment.

In greater detail, a relatively lower steady-state frequency may interact, to a greater degree, with a region of a proximate environment that is more distant from the vibratory source 30, while a relatively higher steady-state frequency may interact, to a greater degree, with a region of the environment that is more proximate to the vibratory source 30.

In one example, a vibratory source may oscillate via rotation (e.g., an imbalanced rotating device), and may produce vibrational energy that is emitted substantially radially during operation thereof. For instance, assuming vibratory source 30 comprises an orbital vibratory source, a steady-state oscillation frequency of the vibratory source 30 may be disproportionately influenced by the environment in relation to its radial distance from the vibratory source 30. Accordingly, a steady-state oscillation frequency of the vibratory source 30 may be selected so as to interact, to a greater degree, with a selected region of the environment.

Figure 1G:
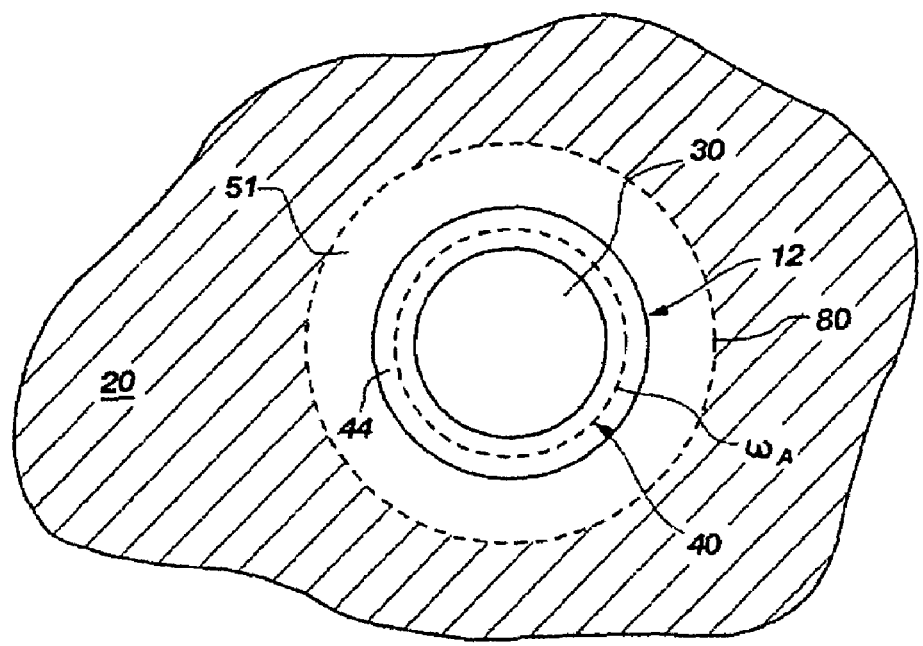
FIG. 1G shows a top elevation view of a vibratory source during operation at a relatively high steady-state oscillation frequency.
Figure 1H:
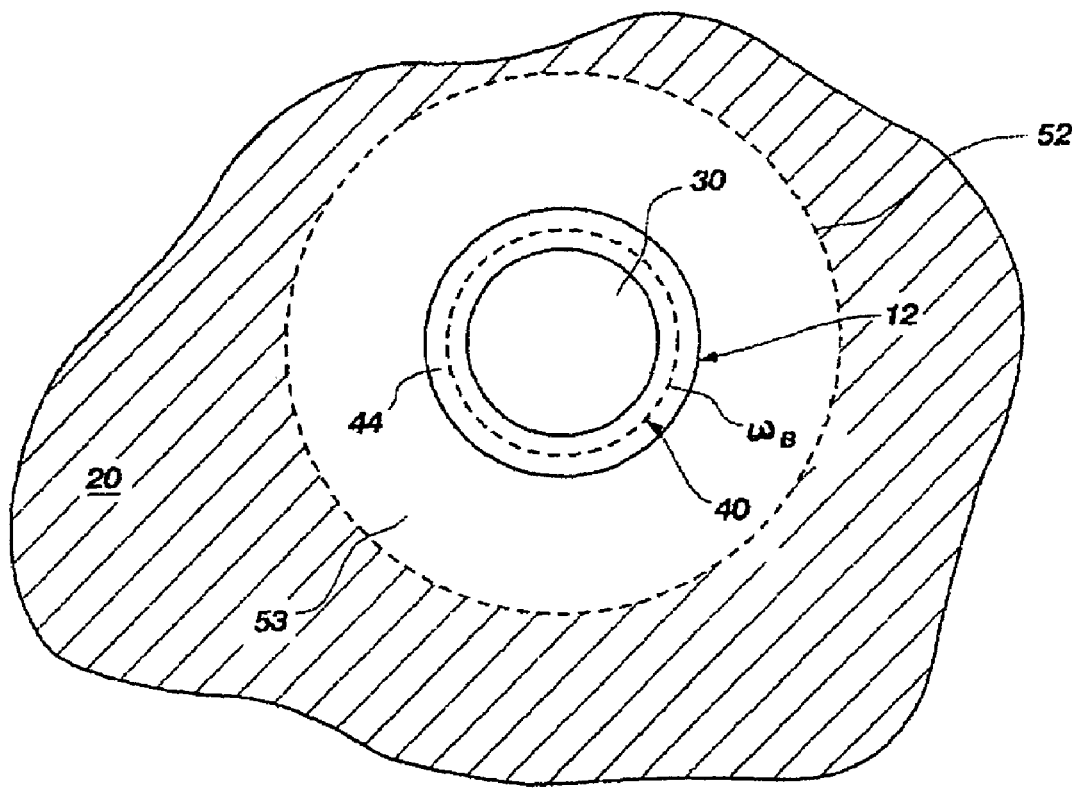
FIG. 1H shows a top elevation view of a vibratory source during operation at a relatively low steady-state oscillation frequency.
Figure 11:
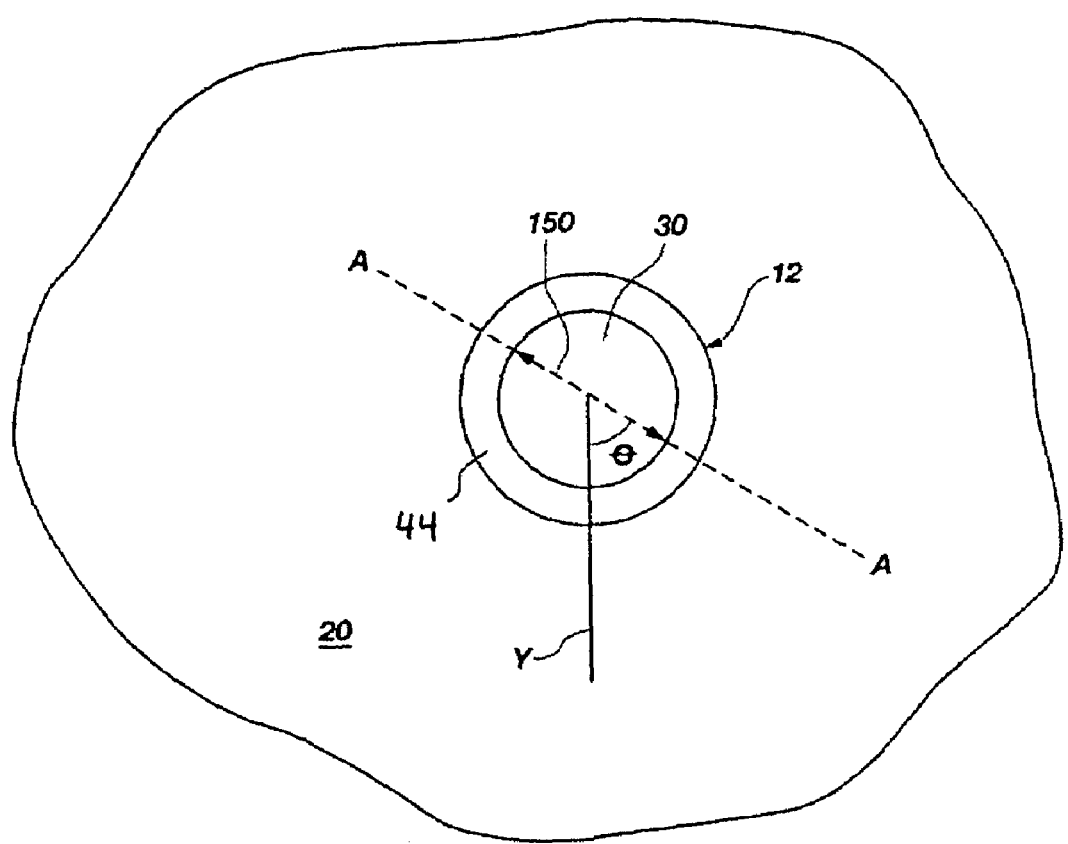

For example, as shown in FIG. 1G, vibratory source 30 may be placed within borehole 12 and operated at a selected, relatively high steady-state oscillation frequency $\omega_A$. As mentioned above, steady-state oscillation frequency $\omega_A$ may be generally chosen (despite a possible unknown magnitude of frequency shift) by adjusting or otherwise choosing the impetus supplied to vibratory source 30, so as to not substantially interact with structures near or within the periphery of the borehole 12, such as a tubular member or cement, if present. Further, operation of vibratory source 30 may substantially interact with the region of subterranean formation 20 positioned radially outside (with respect to the center of the vibrational energy) of boundary line 80. Thus, region 51, while transmitting vibrational energy therethrough may not substantially influence the steady-state oscillation frequency of vibratory source 30. Similarly, in a further example, as shown in FIG. 1H, vibratory source 30 may be placed within borehole 12 and operated at a selected, relatively low steady-state oscillation frequency $\omega_B$. Operation of vibratory source 30 at steady-state oscillation frequency $\omega_B$ may substantially interact with the region of subterranean formation 20 positioned radially outside of boundary line 52. Thus, region 53, while transmitting vibrational energy therethrough may not substantially influence the steady-state oscillation frequency of vibratory source 30.

Thus, as may be appreciated, by operating vibratory source 30 at a first steady-state oscillation frequency $\omega_A$ and operating vibratory source 30 at a second steady-state oscillation frequency $\omega_B$, a difference in at least one characteristic between region 53 and region 51 may be ascertained. Put another way, if operation of vibratory source 30 generates a first steady-state oscillation frequency $\omega_A$ (for a given first impetus) and operation of vibratory source 30 oscillating generates a second steady-state oscillation frequency $\omega_B$ (for a given second impetus), the difference between the damping exhibited for each of the two oscillation frequencies $\omega_B$ and $\omega_A$, if any, may be attributable to a difference in a damping characteristic of regions 51 and 53. In this way, at least one characteristic of a selected region of a proximate environment may be isolated and determined. Thus, a selected spatial region of a subterranean formation or other proximate environment may be investigated (e.g., isolated) via operation of a vibratory source at different steady-state oscillation frequencies.

In another aspect of selecting a region for interaction with a vibratory source, a so-called "mode" of oscillation may be selected or may be selectively controlled for influencing interaction with a region of a proximate environment. In further detail, a vibratory source may be configured for oscillation about a fixed point, an axis, or a boundary so as to preferentially interact or communicate vibrational energy into a selected region of a proximate environment. For instance, a particular region of interaction may be selected for indication of at least one characteristic thereof via operation of a vibratory source and a mode of oscillation of a vibratory source may be chosen, for preferentially interacting with the chosen region of a proximate environment.

For instance, a vibratory source may be configured for oscillation along a single axis of vibration. One example of a single-axis vibrator (also known as a linear vibrator) may comprise a double-acting pneumatic piston disposed within a bore wherein the piston may be caused to oscillate back and forth therein by alternately pressurizing each chamber of the two chambers formed within the bore on each side of the piston. Examples of single-axis oscillators or vibrators may be commercially available from Martin Vibration System and Solutions of Marine City, Mich. Assuming that a vibratory source comprises a single-axis oscillator, a region of a proximate environment influenced by the vibrational energy thereof may relate to a frequency of oscillation of the vibratory source, as explained above. Further, a region of a proximate environment influenced by the vibrational energy of a vibratory source comprising a single-axis oscillator may be influenced by its vibrational motion direction (i.e., direction in which the vibratory source oscillates). Accordingly, a steady-state oscillation frequency of the vibratory source may be selected so as to interact, to a greater degree, with a selected region of a proximate environment, as described hereinbelow.

For example, as shown in FIG. 1I, vibratory source 30 may be placed within borehole 12 and operated at a selected steady-state oscillation frequency along axis A-A, which may be termed an axis of vibration or vibration axis 150. Thus, vibratory source 30 may generate vibrational energy as an oscillation (e.g., to and fro) generally along or parallel vibration axis 150. Accordingly, vibrational energy may be communicated through acoustic medium 44 and into subterranean formation 20 within a generally cone-shaped or frusto-conically shaped region, (illustrated as a circumferential or pie-shaped section in FIG. 1J) generally centered about the vibration axis 150, as discussed hereinbelow.

Figure 1J:
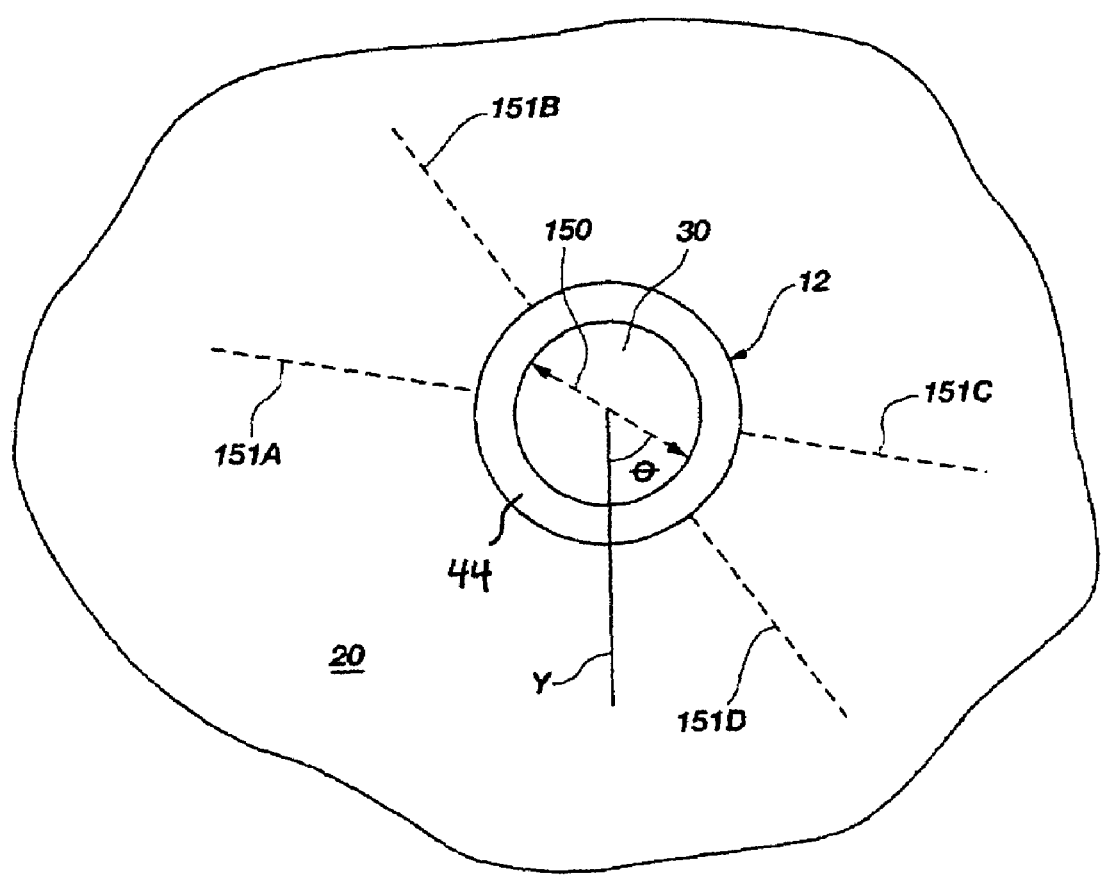
FIG. 1J shows the vibratory source as shown in FIG. 1I, further depicting conceptualized regions of interaction of a subterranean formation with the vibratory source.

Particularly, FIG. 1J shows reference lines 151A, 151B, 151C, and 151D depicting general regions within which vibrational energy of vibratory source 30 may be transmitted within subterranean formation 20, as described as follows. Since vibratory source 30 may oscillate along vibration axis 150, vibrational energy may be transmitted through acoustic medium 44 into the region of subterranean formation 20 circumferentially between reference lines 151A and 151B. Similarly, or symmetrically, vibrational energy may be transmitted through acoustic medium 44 into the region of subterranean formation 20 circumferentially between reference lines 151C and 151D. It should be understood that the circumferential regions depicted between reference lines 151A and 151B and between 151C and 151D are merely conceptualized and simplified and, therefore, may vary considerably in reality.

Figure 1K:
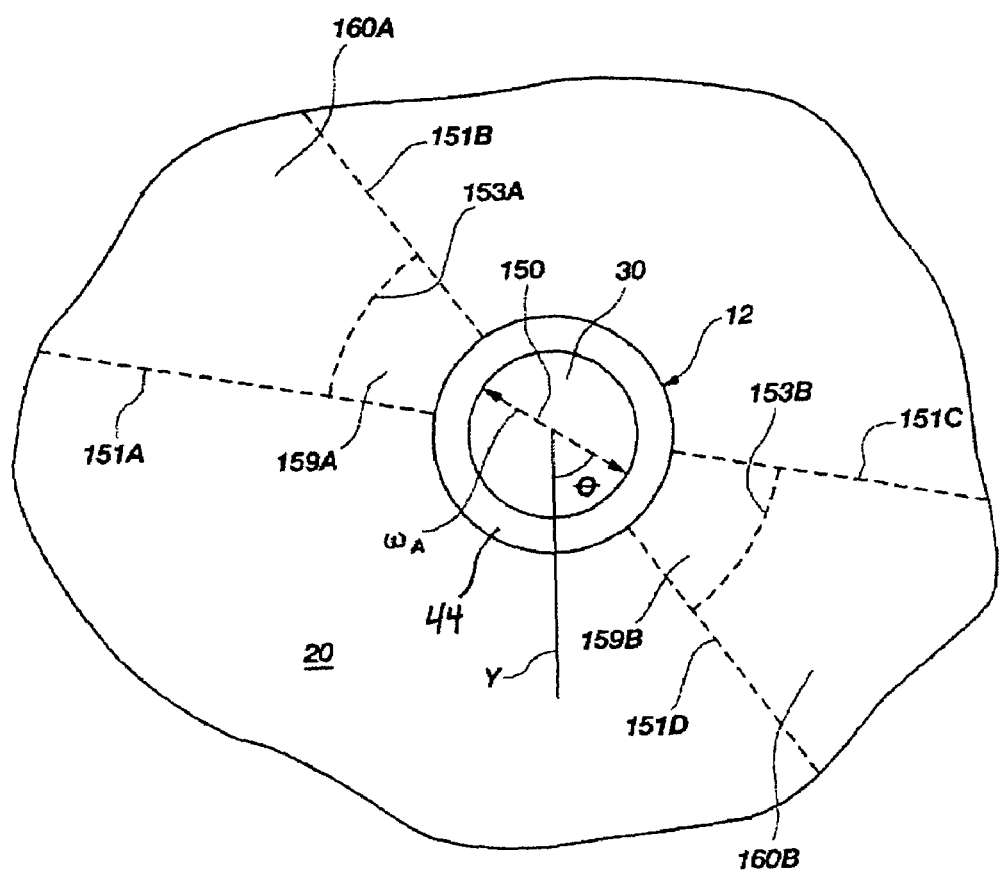
FIG. 1K shows a top elevation view of the vibratory source shown in FIGS. 1I and 1J during operation at a relatively high steady-state oscillation frequency.

As mentioned above, a relatively high steady-state oscillation frequency $\omega_A$ may be generally chosen (despite a possible, unknown magnitude of frequency shift) so as to not substantially interact with structures near or within the periphery of the borehole 12, such as a tubular member (not shown), if present. As shown in FIG. 1K, relatively high steady-state oscillation frequency $\omega_A$ may be chosen so that operation of vibratory source 30 may substantially interact to a greater degree with the region 160A of subterranean formation 20, positioned radially exceeding boundary line 153A and circumferentially between reference lines 151A and 151B. Thus, region 159A, while transmitting vibrational energy therethrough may not substantially influence the steady-state oscillation frequency of vibratory source 30. Operation of vibratory source 30 may further substantially interact with the region 160B of subterranean formation 20 radially exceeding boundary line 153B, circumferentially between reference lines 151C and 151D. Thus, region 159B may transmit vibrational energy therethrough but may not substantially influence the steady-state oscillation frequency of vibratory source 30.

Figure 1L:
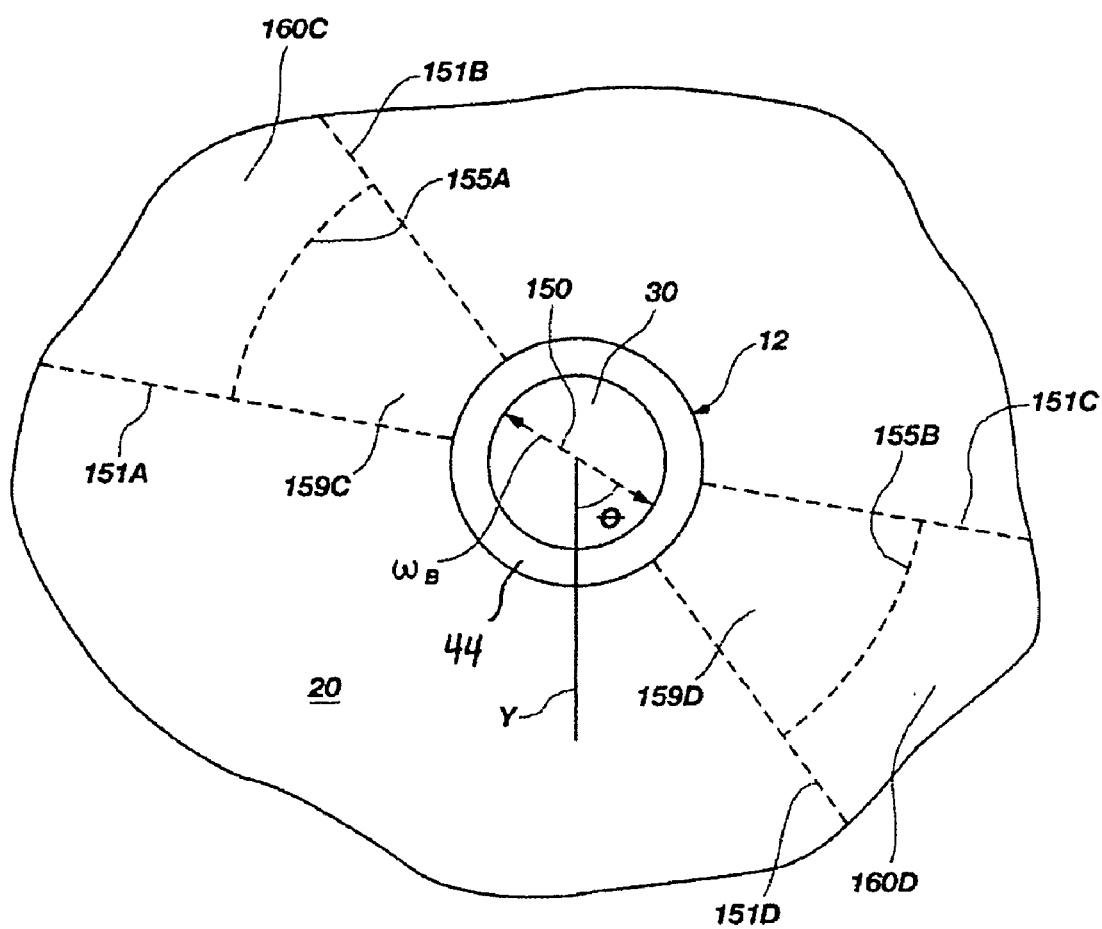
FIG. 1L shows a top elevation view of the vibratory source shown in FIGS. 1I and 1J during operation at a relatively low steady-state oscillation frequency.

Similarly, in a further example, as shown in FIG. 1L, vibratory source 30 may be placed within borehole 12 and operated at a selected, relatively low steady-state oscillation frequency $\omega_B$. Operation of vibratory source 30 at steady-state oscillation frequency $\omega_B$ may cause a greater degree of interaction with the regions 160C and 160D of subterranean formation 20, positioned radially exceeding boundary lines 155A and 155B and circumferentially between reference lines 151A and 151B and 151C and 151D, respectively. Thus, regions 159C and 159D may transmit vibrational energy therethrough without substantially influencing the steady-state oscillation frequency of vibratory source 30.

Thus, in one aspect of the present invention, it may be preferable to select a steady-state oscillation frequency according to a desired region interaction with a proximate environment. Generally, as applied to the configuration as shown in FIG. 1A, a steady-state oscillation frequency may be chosen to be at least low enough to substantially inhibit interaction with tubular member 14.

In a further aspect of the present invention, the orientation of the vibration axis 150 of vibratory source 30 may be selectively chosen for interacting with a desired region of a proximate environment. For example, as shown in FIGS. 1I-1L, each showing a top elevation view of a vibratory source 30 proximate subterranean formation 20, a single-axis vibrator may produce a region of interaction which is generally disposed about vibration axis 150. Further, the vibration axis 150 along which vibrational energy of vibratory source 30 is directed may be positionable with respect to axis Y at a selected angle θ. Particularly, a positionable device (not shown) and position sensor (not shown), such as a stepper motor may be placed along structural member 24, above vibratory source 30. Such a configuration may allow for orientation of a vibration axis 150 of vibratory source 30 and, thus, selective interaction with selected regions of an environment surrounding a vibratory source and, correspondingly, selective determination of at least one characteristic of a selected region of an environment.

It should be apparent that a vibratory source may have the capability to vibrate in more than one fashion (e.g., radially, linearly, along more than one axis, etc.) so as to selectively influence a selected region of a proximate environment. Put another way, a vibratory source may be configured to exhibit one or more different vibrational modes. In addition, although the present invention is described in terms of vibrational energy imparted laterally or into a sidewall of a proximate environment, the present invention is not so limited. Rather, the present invention contemplates vibrational energy may be generated along at least one axis or orientation, for instance along a longitudinal axis of the vibratory source 30 (i.e., vertical or up and down). Such a configuration may be useful for determining at least one characteristic proximate a surface by moving the end of a vibratory source proximately thereover. Further, it may be preferable to selectively orient and select a vibrational mode of a vibratory source for imparting vibrational energy toward a desired region of a proximate environment.

While the above examples illustrate an environment that generally surrounds (at least in one plane) a vibratory source, the present invention is not so limited. Rather, as described herein, the present invention relates to determining at least one characteristic of a proximate environment by imparting vibrational energy thereto, through an acoustic medium. Thus, while the present invention is described hereinabove with respect to a borehole, the present invention is not so limited. Rather, other physical configurations may be encompassed by the present invention, without limitation. Generally, the present invention may be practiced within any region of an environment that is accessible to (i.e., may be proximately positioned with respect to) a vibratory source, without limitation.

Figure 2A:
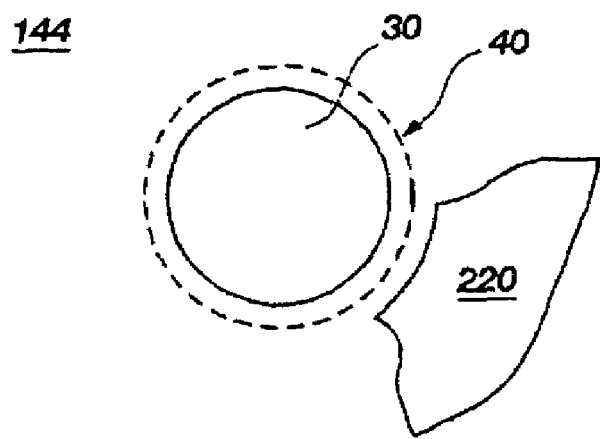
FIG. 2A shows a top elevation view of a vibratory source configured for substantially radial vibration in proximity to a medium.

For instance, FIG. 2A shows a top elevation view of vibratory source 30 within acoustic medium 144 proximate medium 220. Vibratory source 30 may oscillate in a generally radial fashion, as illustrated by displacement envelope 40. At least one impetus may be selected for operation of the vibratory source 30 and may be adjusted so that a desired steady-state oscillation frequency is attained. Further, the steady-state oscillation frequency of the vibratory source 30 may be selected for interaction with a desired radial region of medium 220, as discussed hereinabove. Of course, at least one characteristic of medium 220 may cause vibratory source 30 to operate at a steady-state oscillation frequency which is less than a maximum steady-state oscillation frequency.

Figure 2B:
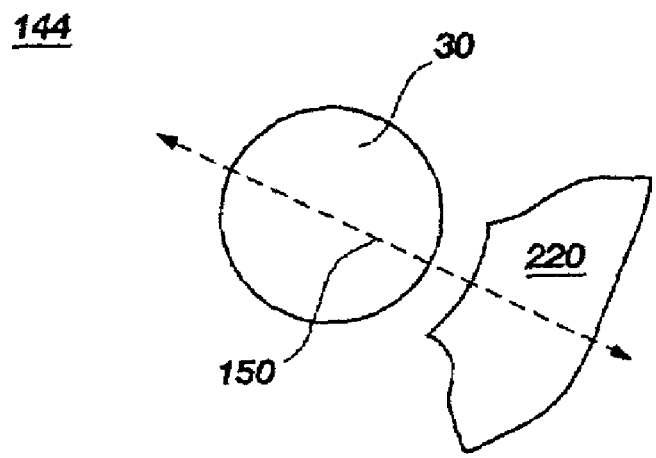
FIG. 2B shows a top elevation view of a vibratory source configured for vibration along an axis of vibration in proximity to a medium.

In another example, FIG. 2B shows a top elevation view of vibratory source 30 within acoustic medium 144 proximate medium 220. Vibration axis 150 may be repeatedly positioned circumferentially and steady-state oscillation frequencies measured so as to determine the circumferential region of vibratory source 30 that is proximate to medium 220. Put another way, orientation of vibration axis 150 and measuring a steady-state oscillation frequency shift may indicate the position or size of medium 220 with respect thereto. Of course, as shown in FIG. 2B vibratory source 30 may be oriented for communicating vibrational energy toward or into medium 220. Thus, at least one characteristic of medium 220 may cause vibratory source 30 to operate at a steady-state oscillation frequency which is less than a maximum steady-state oscillation frequency.

Figure 3A:
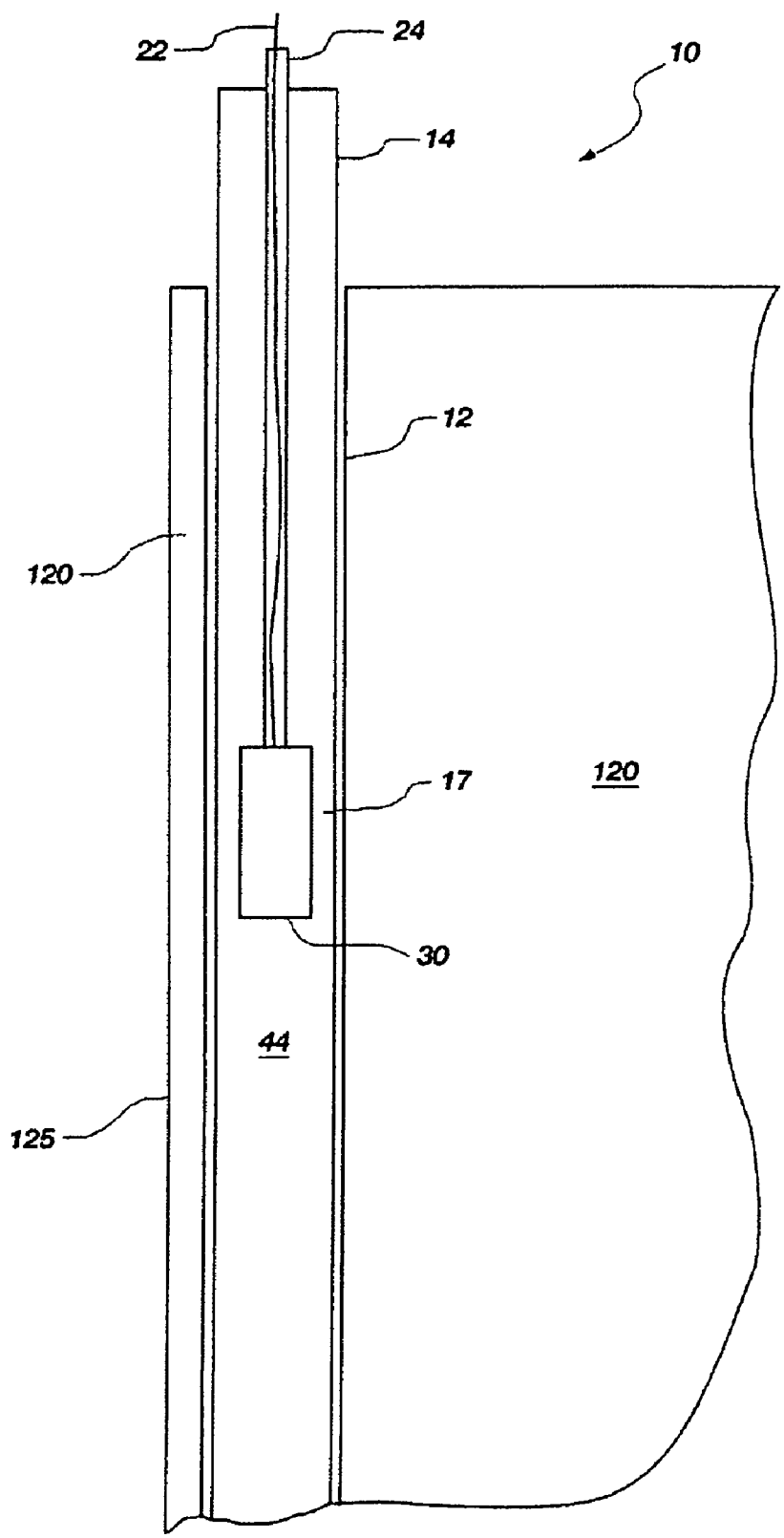
FIG. 3A shows a schematic side view of an apparatus including a vibratory source positioned within a borehole having an exterior side wall proximate thereto.
Figure 3B:
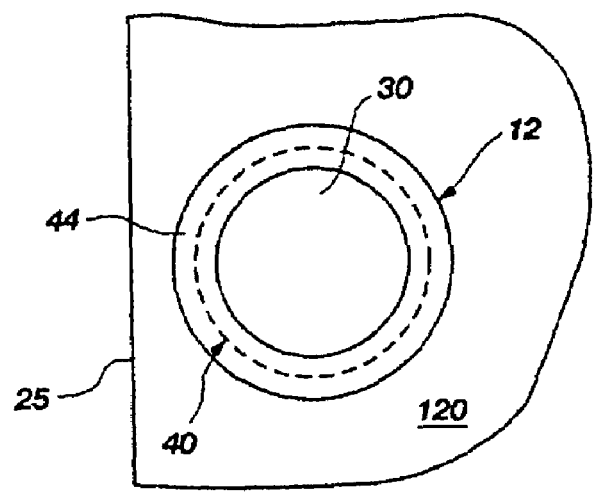
FIG. 3B shows a top elevation view of the vibratory source shown in FIG. 3A.

As may be appreciated from the above discussion, in another aspect of the present invention, the at least one characteristic determined by an apparatus or method of the present invention of a proximate environment may be related to the geometry or structure of the environment itself. For example, FIGS. 3A and 3B illustrate a configuration of a surrounding subterranean formation 120 wherein a borehole 12 is formed near a side wall 125 (e.g., a cliff) thereof, in a top elevation view and a side cross-sectional view, respectively. Generally as described above, at least one characteristic of a proximate environment may be determined by comparing a steady-state oscillation frequency of vibratory source 30 during operation to a maximum steady-state oscillation frequency of vibratory source 30 which may be determined. In comparison to FIG. 1A, wherein subterranean formation 120 may approximate an infinite elastic body surrounding vibratory source 30, borehole 12 represents a different boundary condition, which may be noticeably different in its interaction with a vibratory source, because side wall 125 defines a free surface near to borehole 12. Further, a steady-state oscillation frequency of vibratory source 30, when positioned within subterranean formation 120 as shown in FIG. 2A, may be perceivably different than a steady-state oscillation frequency of vibratory source 30 when placed within subterranean formation 20 as shown in FIG. 1A, for a substantially identical impetus supplied thereto.

Thus, according to the present invention, at least one characteristic of a proximate environment may include a geometrical or boundary condition of the environment. Put another way, operation of a vibratory source 30 may indicate a geometrical characteristic of a surrounding environment.

Figure 4A:
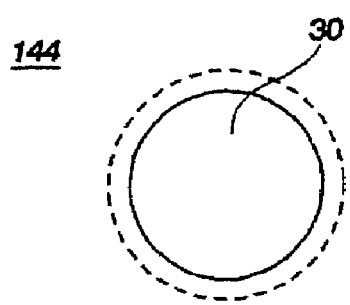
FIG. 4A shows a schematic top elevation view of a vibratory source positioned within an acoustic medium.

Further, in yet a further aspect of the present invention, the present invention further contemplates that at least one characteristic of an acoustic medium proximate to a vibratory source may be determined. For example, FIG. 4A shows a vibratory source 30 within acoustic medium 140. Although acoustic medium 144 may be confined or contained within another structure (not shown), the vibratory source 30 may be configured for substantial interaction with the acoustic medium 144. The present invention further contemplates that a steady-state oscillation frequency shift may indicate a property of the acoustic medium (e.g., a pressure, a temperature, a viscosity, a density, etc.). Such a configuration may be useful for sensing at least one characteristic of the acoustic medium.

Figure 4B:
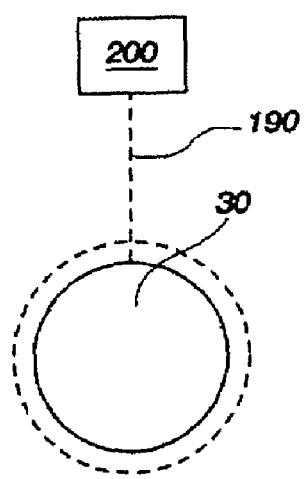
FIG. 4B shows a schematic representation a vibratory source coupled to a dissipative device.

In a further generalized example, FIG. 4B shows schematic representation of a vibratory source 30 coupled to a device 200 via coupling element 190. Particularly, device 200 may exhibit dissipation of the vibrational energy of the vibratory source 30. Such a device 200 may be a mechanical apparatus (e.g., a car, a boat, etc.), a structure (e.g., a bridge, a building, etc.), or any other structure that dissipates a vibrational energy imparted thereto.

Summarizing, generally, conceptually, at least one characteristic of the proximate environment (e.g., a dissipative medium or device) may be determined by communicating vibrational energy thereinto at a steady-state oscillation frequency which is less than a maximum steady-state oscillation frequency and is at least partially influenced by the proximate environment. Put another way, vibrational energy may be imparted into an environment through an acoustic medium and a magnitude of the vibratory damping of the vibrational energy due to the environment may be measured, and at least one characteristic of the region of the environment may be determined based, at least in part, on the magnitude of the vibratory damping of the environment. More specifically, an analysis device such as a computer may be provided for determining at least one characteristic of the environment based at least partially upon the magnitude of vibratory damping. In one example, an actual steady-state oscillation frequency of a vibratory source during operation may be compared to a maximum steady-state oscillation frequency of the vibratory source.

While the present invention has been described herein with respect to certain preferred embodiments, those of ordinary skill in the art will recognize and appreciate that it is not so limited. Rather, many additions, deletions and modifications to the preferred embodiments may be made without departing from the scope of the invention as hereinafter claimed. In addition, features from one embodiment may be combined with features of another embodiment while still being encompassed within the scope of the invention as contemplated by the inventors. Therefore, the invention is to cover all modifications, equivalents, and alternatives falling within the spirit and scope of the invention as defined by the following appended claims.

What is claimed is:

1. A method of determining at least one characteristic of an environment, the method comprising:
   operating a vibratory source proximate to an environment and coupled thereto through an acoustic medium so as to exhibit at least one steady-state oscillation frequency for an associated at least one impetus;
   indicating the at least one steady-state oscillation frequency of the vibratory source during operation;
   determining a maximum steady-state oscillation frequency of the vibratory source for the associated at least one impetus when the vibratory source is remote from the environment; and
   determining at least one characteristic of an environment proximate to the vibratory source based, at least in part, on the at least one steady-state oscillation frequency of the vibratory source in relation to the maximum steady-state oscillation frequency of the vibratory source.

2. The method of claim 1, wherein indicating the at least one steady-state oscillation frequency of the vibratory source during operation comprises collecting a signal from a motion sensor.

3. The method of claim 2, wherein collecting the signal from the motion sensor comprises collecting the signal from at least one of a geophone, an accelerometer, and an encoder.

4. The method of claim 2, wherein indicating the at least one steady-state oscillation frequency of the vibratory source during operation further comprises analyzing the collected signal to determine the at least one steady-state oscillation frequency of the vibratory source.

5. The method of claim 4, wherein analyzing the collected signal comprises performing a fast-Fourier transform in relation to the collected signal to determine the at least one steady-state oscillation frequency of the vibratory source.

6. The method of claim 1, wherein operating the vibratory source comprises operating the vibratory source so as to exhibit a steady-state oscillation frequency of between about 20 Hertz to 450 Hertz.

7. The method of claim 1, wherein determining the maximum steady-state oscillation frequency of the vibratory source comprises at least one of simulating, modeling, and empirically determining the at least one maximum steady-state oscillation frequency of the vibratory source during operation.

8. The method of claim 7, wherein determining the maximum steady-state oscillation frequency of the vibratory source comprises analyzing at least one equation of motion generated for describing the behavior of the vibratory source.

9. The method of claim 8, further comprising approximating at least one solution for the at least one equation of motion, respectively, by way of performing at least one of numerical integration and perturbation analysis.

10. The method of claim 1, wherein determining at least one characteristic of the environment proximate to the vibratory source comprises determining at least one of an elasticity, a density, and a bulk modulus of the environment.

11. The method of claim 1, wherein determining at least one characteristic of the environment proximate to the vibratory source comprises determining a dissipation of the environment.

12. The method of claim 1, wherein determining at least one characteristic of the environment proximate to the vibratory source comprises determining a presence of a liquid within the environment.

13. The method of claim 1, wherein operating the vibratory source so as to exhibit the at least one steady-state oscillation frequency comprises selecting the at least one steady-state oscillation frequency for interaction with a selected region of the environment.

14. The method of claim 13, wherein selecting the at least one steady-state oscillation frequency for interaction with a selected region of the environment comprises selecting the at least one steady-state oscillation frequency for interaction with a selected radial region of the environment.

15. The method of claim 1, further comprising moving the vibratory source.

16. The method of claim 15, wherein the at least one steady-state oscillation frequency of the vibratory source changes in response to moving the vibratory source.

17. The method of claim 15, wherein moving the vibratory source comprises moving the vibratory source from a first position to a second position.

18. The method of claim 17, further comprising collecting a signal from a motion sensor while moving the vibratory source from the first position to the second position.

19. The method of claim 1, wherein:
operating the vibratory source so as to exhibit the at least one steady-state oscillation frequency comprises operating the vibratory source so as to exhibit a plurality of steady-state oscillation frequencies; and
indicating the at least one steady-state oscillation frequency of the vibratory source during operation comprises indicating each of the plurality of steady-state oscillation frequencies of the vibratory source during operation.

20. The method of claim 19, further comprising selecting at least one of the plurality of steady-state oscillation frequencies for interaction with a selected region of the environment.

21. The method of claim 1, further comprising directing a vibrational energy of the vibratory source toward a selected region of the environment.

22. The method of claim 21, wherein directing a vibrational energy of the vibratory source toward a selected region of the environment comprises orienting an axis of vibration of the vibratory source.

23. A method of determining at least one characteristic of an environment, the method comprising:
imparting a vibrational energy into an environment with a vibratory source having at least one impetus;
measuring a magnitude of damping of the vibrational energy by way of the environment relative to a vibrational energy that would be imparted remote from the environment by the vibratory source having the at least one impetus; and
determining at least one characteristic of the environment based, at least in part, on the magnitude of damping.

24. The method of claim 23, wherein imparting vibrational energy into the environment comprises operating a vibratory source proximate to the environment.

25. The method of claim 24, wherein measuring a magnitude of damping of the vibrational energy by way of the environment comprises indicating a steady-state oscillation frequency of the vibratory source during operation.

26. The method of claim 25, further comprising collecting a signal from at least one of a geophone, an accelerometer, and an encoder.

27. The method of claim 26, wherein indicating the steady-state frequency of oscillation of the vibratory source during operation further comprises analyzing a collected signal to determine the steady-state frequency of oscillation of the vibratory source.

28. The method of claim 27, wherein analyzing the collected signal comprises performing a fast-Fourier transform in relation to the collected signal to determine the steady-state oscillation frequency of the vibratory source.

29. The method of claim 25, further comprising determining a maximum steady-state oscillation frequency of the vibratory source by way of at least one of simulating, modeling, and empirically determining the maximum steady-state oscillation frequency of the vibratory source during operation.

30. The method of claim 29, wherein determining the maximum steady-state oscillation frequency of the vibratory source comprises analyzing at least one equation of motion for describing the behavior of the vibratory source.

31. The method of claim 30, further comprising approximating at least one solution for the at least one equation of motion, respectively, by way of performing at least one of numerical integration and perturbation analysis.

32. The method of claim 23, wherein determining at least one characteristic of the environment comprises determining at least one of an elasticity, a density, and a bulk modulus of the environment.

33. The method of claim 23, wherein determining at least one characteristic of the environment comprises determining a dissipation of the environment.

34. The method of claim 23, wherein determining at least one characteristic of the environment comprises determining a presence of a liquid within the environment.

35. The method of claim 23, further comprising:
operating a vibratory source so as to exhibit a plurality of steady-state oscillation frequencies; and
indicating each of the plurality of steady-state oscillation frequencies of the vibratory source during operation.

36. The method of claim 23, wherein imparting the vibrational energy into the environment comprises directing the vibrational energy toward a selected region of the environment.

37. The method of claim 36, wherein directing the vibrational energy of the vibratory source toward the selected region of the environment comprises orienting an axis of vibration of a vibratory source.

38. The method of claim 23, wherein imparting the vibrational energy into the environment comprises selecting an oscillation frequency of the vibrational energy.

39. The method of claim 23, wherein imparting the vibrational energy into the environment comprises imparting vibrational energy into the environment at a steady-state oscillation frequency which is less than a maximum steady-state oscillation frequency by way of operating a vibratory source.

40. The method of claim 39, further comprising indicating the steady-state oscillation frequency of the vibratory source during operation by sensing a motion of the vibratory source to determine the steady-state oscillation frequency of the vibratory source.

41. The method of claim 40, wherein sensing the motion of the vibratory source comprises performing a fast-Fourier transform in relation to the sensed motion of the vibratory source to determine the steady-state oscillation frequency of the vibratory source.

42. An apparatus for determining at least one characteristic of an environment, comprising:
at least one vibratory source;
a structure for positioning the at least one vibratory source proximate to an environment;
an analysis device for determining at least one characteristic of the environment based at least partially upon an actual steady-state oscillation frequency of a vibratory source for a given impetus of the at least one vibratory source during operation within the environment in comparison to a maximum steady-state oscillation frequency of the vibratory source for the given impetus outside the environment.

43. The apparatus of claim 42, wherein the at least one vibratory source is structured and configured for oscillating in a generally radial fashion.

44. The apparatus of claim 43, wherein the at least one vibratory source comprises a plurality of vibratory sources.

45. The apparatus of claim 42, wherein the at least one vibratory source is structured and configured for oscillating along an axis of vibration.

46. The apparatus of claim 45, wherein the at least one vibratory source comprises a plurality of vibratory sources.

47. The apparatus of claim 42, wherein the at least one vibratory source comprises at least one of an imbalanced rotating device and a single-axis vibrator.

48. The apparatus of claim 42, wherein the analysis device comprises a computing device.

49. The apparatus of claim 48, wherein the computing device is configured for performing a fast-Fourier transform.

50. The apparatus of claim 42, wherein the structure for positioning the at least one vibratory source is movable.

51. The apparatus of claim 42, wherein the structure for positioning the at least one vibratory source comprises at least one of a cable or a tubing string.

52. The apparatus of claim 51, wherein the structure for positioning the at least one vibratory source includes a wireline.

53. The apparatus of claim 42, wherein the at least one vibratory source comprises a plurality of vibratory sources.

54. The apparatus of claim 42, further comprising an orientation device configured for orienting the at least one vibratory source.

55. The apparatus of claim 54, wherein the orientation device is configured for directing the vibrational energy of the at least one vibratory source toward a selected direction.

56. The apparatus of claim 54, wherein the orientation device comprises a stepper motor.

57. The apparatus of claim 42, further comprising a motion sensor for sensing the vibratory motion of the at least one vibratory source.

58. The apparatus of claim 57, wherein the motion sensor comprises at least one of a geophone, an accelerometer, and an encoder.

* * * * *